(12) United States Patent
Tyler et al.

(10) Patent No.: US 8,571,928 B2
(45) Date of Patent: *Oct. 29, 2013

(54) METHODS AND SYSTEMS FOR RETAIL CUSTOMER REFERRAL COMPENSATION PROGRAMS

(75) Inventors: J. Benjamin Tyler, Orem, UT (US); Kenneth D. Roland, Orange Park, FL (US); Thomas Thornton, Granite Bay, CA (US); DelMar P. Williams, Highland, UT (US); Kevin F. Baadsgaard, Spanish Fork, UT (US)

(73) Assignee: Motherlode Network, American Fork, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,557

(22) Filed: Sep. 16, 2011

(65) Prior Publication Data
US 2012/0209676 A1   Aug. 16, 2012

Related U.S. Application Data

(63) Continuation-in-part of application No. 11/951,466, filed on Dec. 6, 2007.

(51) Int. Cl.
*G06Q 40/00* (2012.01)
(52) U.S. Cl.
USPC ..................................... 705/14.16

(58) Field of Classification Search
USPC ........................................... 705/14
See application file for complete search history.

(56) References Cited

U.S. PATENT DOCUMENTS

| 6,421,648 | B1 | 7/2002 | Gagnon et al. |
|---|---|---|---|
| 7,149,707 | B2 | 12/2006 | Scoble |
| 2004/0093269 | A1 | 5/2004 | Rubin et al. |
| 2004/0158537 | A1 | 8/2004 | Webber et al. |
| 2005/0222967 | A1 | 10/2005 | Adir |
| 2007/0156445 | A1 | 7/2007 | Manuel et al. |
| 2008/0077485 | A1 | 3/2008 | Scrudato |
| 2008/0320004 | A1 | 12/2008 | Jain et al. |

FOREIGN PATENT DOCUMENTS

| JP | 2006323799 | 11/2006 |
|---|---|---|
| KR | 20040022794 | 3/2004 |

OTHER PUBLICATIONS http://www.mlmconsultant.com/mlmlibrary_matrix_mlm.htm (website accessed Mar. 2, 2012).

*Primary Examiner* — Thomas M Hammond, III
(74) *Attorney, Agent, or Firm* — Kirton McConkie; Michael F. Krieger

(57) ABSTRACT

Embodiments of the present invention relate generally to business methods and systems for retail marketing, and specifically to Retail Customer Referral Compensation Programs for using Performance-Driven criteria to award Production Points for determining a Referring Customer's position in a Performance-Driven Floating Matrix compensation and matching bonus plan in a retail marketing organization.

16 Claims, 17 Drawing Sheets

501 — HOW A REFERRING CUSTOMER MAY EARN PRODUCTION POINTS 12 points – For signing-up on Auto-Purchase Program.
    1 points – Each consecutive month on Auto-Purchase Program.
    5 Points – Each Personally Enrolled Enrolling Customers.
    3 Points – Each Personally Enrolled Second Level Customers.
    2 Points – Each Personally Enrolled Third Level Customer
    1 Point – Each Personally Enrolled Fourth Level Customer
    10 Points – $25,000 Total Group Volume
    20 Points – $50,000 Total Group Volume

503 — EXAMPLES OF HOW A REFERRING CUSTOMER MAY EARN PRODUCTION POINTS 12 points – For signing-up on Auto-Purchase Program.
    15 Points – 3 Personally Enrolled Enrolling Customers (5 points each)
    15 Points – 5 Personally Enrolled Second Level Customers (3 points each)
    20 Points – 10 Personally Enrolled Third Level Customers (2 points each)
    62 Points – Total Monthly Performance Points

505 — EXAMPLES OF HOW A REFERRING CUSTOMER MAY EARN PRODUCTION POINTS 12 points – For signing-up on Auto-Purchase Program. (PE 1 ea. Month for 3 months)
    3 points – 3 consecutive months on Auto-Purchase Program.
    25 Points – 5 Personally Enrolled Enrolling Customers (5 points each)
    45 Points – 15 Personally Enrolled Second Level Customers (3 points each)
    40 Points – 20 Personally Enrolled Third Level Customers (2 points each)
    18 Points – 18 Personally Enrolled Fourth Level Customers (1 point each)
    20 Points – 5 Personally Enrolled Retail or Auto-Purchase Customers (4 points each)
    163 Points – Total Monthly Performance Points

507 — EXAMPLES OF HOW A REFERRING CUSTOMER MAY EARN PRODUCTION POINTS 12 points – For signing-up on Auto-Purchase Program. (PE 1 ea. mo. for 8 mos.)
    8 points – 8 consecutive months on Auto-Purchase Program.
    50 Points – 10 Personally Enrolled Enrolling Customers (5 points each)
    150 Points – 50 Personally Enrolled Second Level Customers (3 points each)
    500 Points – 250 Personally Enrolled Third Level Customers (2 points each)
    400 Points – 400 Personally Enrolled Fourth Level Customers (1 point each)
    10 Points – $25,000 Total Group Volume
    1130 Points – Total Monthly Performance Points

METHODS AND SYSTEMS FOR RETAIL CUSTOMER REFERRAL COMPENSATION PROGRAMS

CROSS-REFERENCE TO RELATED APPLICATIONS

This application is a continuation-in-part of prior application Ser. No. 11/951,466 filed Dec. 6, 2007, which is herein incorporated by reference.

FIELD OF THE INVENTION

The present invention relates generally to business methods and systems for retail marketing, and specifically to retail customer referral programs for using production-based criteria to award Production Points for determining a retail customer's position in a Performance-Driven Floating Matrix compensation plan in a network and retail marketing organization.

It could be applied to existing basis compensation plans of all types including breakaway, unilevel, matrix, binary and other plans or it could be used as a plan itself

BACKGROUND OF THE INVENTION

Network marketing, also known as Multi-level marketing or MLM, is a business model that combines direct retail marketing with a salesforce of independent contractors. Network marketing is an alternate channel for a manufacturer or retailer to advertise, sell and deliver its products to market. Other channels may include retail storefronts, catalog shopping, and door-to-door sales.

Network marketing businesses usually function by enrolling unsalaried salespeople, also known in the business as Independent Distributors, Independent Business Owners, Sales Consultants, etc., (hereinafter "Independent Distributor") to sell products and earn additional sales commissions based on the sales of people recruited into their downline, an organization, that includes direct recruits, recruits' recruits and so on such that there may be multiple levels of people receiving commissions from one person's sales.

Network marketing offers several advantages over the other retail channels such as low advertising overhead. Unlike a typical retail company, the network marketing company doesn't have to spend large amounts of money to obtain customers. Instead, it pays Independent Distributors to expose and promote the product out into the marketplace. In addition, the company only has to pay the Independent Distributor a percentage commission on products actually sold.

In a traditional network marketing organization Independent Distributors are rewarded for the sales they create, not only directly, but indirectly as well. Independent Distributors earn profit from any retail sales they make, plus they also may earn a bonus or override on the sales made by people they recruited into the company, and the people they recruited, and the people they recruited, etc. By getting a small percentage from many people, their income can grow to a very large number.

Over the years, companies have developed a variety of network marketing compensation plans. Some of these include breakaway, unilevel, matrix, and binary.

The traditional "matrix" is a plan with a structure that has a fixed "shape" that determines the size of the organization, or personal enroller genealogy, the Independent Distributor can be paid on. For example, if a company uses a 4×4 matrix, the Independent Distributor can have no more than 4 people on their "frontline", and can be paid no more than 4 levels deep. If they already have 4 people on their frontline, any future people they enroll will have to be "placed" somewhere below those 4 frontline people. This is called "spillover".

Matrix plans limit the width of each level in an Independent Distributor's group, forcing successful recruiters to position their recruits under other people who did not recruit them ("spillover"). Spillover therefore can be viewed as either a curse or a blessing, with proponents saying it's a great way to cause people to help their downlines since recruits will automatically be placed below their downline distributors. Spillover also tends to keep people active, because they don't want to lose out on the recruits spilling over from their upline. Others argue that spillover rewards weak and non-performing Independent Distributors, because if an Independent Distributor is producing, they will already have people below them, causing new recruits to likely be placed in the "holes" under non-producers. In a traditional fixed matrix plan, an Independent Distributor remains permanently in the original position into which they were recruited and so has little incentive to recruit additional participants once their matrix downline is full.

These plans typically have some provisions for paying commissions and incomes on the volume of sales made during a certain time period. There is typically a minimum "group volume" requirement for an Independent Distributor to qualify for these commissions. The number of levels of volume in the matrix the Independent Distributor is paid on and the percentages they receive are dependent on the company and the position they have reached. In a conventional matrix marketing plan the sales volume made by an Independent Distributor only benefits their direct personal and/or placement upline.

Accordingly, there is a need in the industry for improved methods and systems for implementing and managing a retail customer referral compensation program with a performance-driven floating matrix plan wherein Independent Distributors may periodically move up and be repositioned in the organizational structure to qualify for commissions and bonuses that they would not qualify for in a traditional fixed matrix plan.

SUMMARY OF THE INVENTION

The present invention provides a Retail Customer Referral Compensation Program for promoting customer loyalty and reducing attrition. The Retail Customer Referral Compensation Program of the present invention may comprise a Performance-Driven Floating Matrix which allows Independent Distributors, Referring Customers, Auto-Purchase Customers and customers in a retail marketing network to move or "float" within the matrix hierarchy, at the end of predetermined compensation periods, based upon Production Points awarded for their performance in certain criteria areas. Performance criteria may include, but are not limited to, areas such as training, sales and enrollment that leads to increased sales. In some embodiments, Production Points may be awarded for personally enrolling Auto-Purchase Customers. An Auto-Purchase Customer may be a preferred retail customer who agrees to purchase product at a special reduced price for having the product automatically shipped to them on a regular pre-scheduled basis, such as once a month. An Auto-Purchase Customer does not participate in the Referral Program's compensation plan. In some embodiments Production Points may also be awarded for becoming a Referring Customer. A Referring Customer may be a customer who purchases product in a manner similar to an Auto-Purchase Customer but they have also furnished a Social Security number or tax ID so they are entitled to qualify for commissions and bonuses in the Referral Program's compensation plan.

In one exemplary embodiment of the present invention, 12 points may be awarded for becoming a Referring Customer. One point may then be deducted for each month the Referring Customer does not enroll a new Auto-Purchase Customer or Referring Customer. One point may also be awarded for each consecutive month of membership as an Auto-Purchase Customer.

Points may also be awarded to continue the emphasis toward teamwork for enrolling retail customers. For example, 5 points may be awarded for each Referring Customer personally enrolled. 3 points may be awarded for each $2^{nd}$ generation enrollee as a Referring Customer, 2 points for each $3^{rd}$ generation enrollee as Referring Customer and 1 point for each $4^{th}$ generation enrollee as Referring Customer.

Additional points may be added to continue the emphasis on individually enrolling Referring Customers, which benefits everyone in the compensation plan because these customers add volume but do not participate in the compensation plan. In one exemplary embodiment 4 points may be awarded for each personally enrolled retail customer or Auto-Purchase Customer.

Points may also be awarded for team building accomplishments such as 10 points for personal group volume of $25,000 or 20 points for personal group volume of $50,000. Points may also be awarded to give flexibility for a company to promote attendance at various training functions such as 1 point for completing each segment of a training program.

Some embodiments of the present invention also comprise Global Matching Bonus Pools, which may be shared at the end of a compensation period with qualified Referring Customers based upon their personal genealogy downline and production in the Performance-Driven Floating Matrix. The bonus pools may be made up from the total wholesale product volume sold each period through the retail Auto-Purchase Customer Referral Compensation Program. Some embodiments may comprise an Enroller Matching Bonus in addition to the Global Matching Bonus pools. The Enroller Matching Bonus may be given to Referring Customers who are personal enrollers and who qualify by having a corresponding number of personally enrolled Referring Customers. In some embodiments, if a personal enroller does not qualify the matching bonus rolls up to the first qualified personal enroller in the upline of the non-qualifying referring customer.

The present invention is an improved retail customer referral compensation program over the prior art. The Performance-Driven Floating Matrix and Matching Bonus Pools of the present invention promote customer loyalty, team building and reduce attrition, while overcoming many of the problems associated with traditional network marketing compensation plans.

Additional objects and advantages of the invention will be set forth in the description which follows, and in part will be obvious from the description, or may be readily learned by the practice of the invention. The objects and advantages of the invention may be realized and obtained by means of the instruments and combinations particularly pointed out in the description. These and other objects and features of the present invention will become more fully apparent from the following description, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5A illustrates an exemplary table of Retail Customer Referral Compensation Program Personal Genealogy Downline Points;

DETAILED DESCRIPTION OF THE INVENTION

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
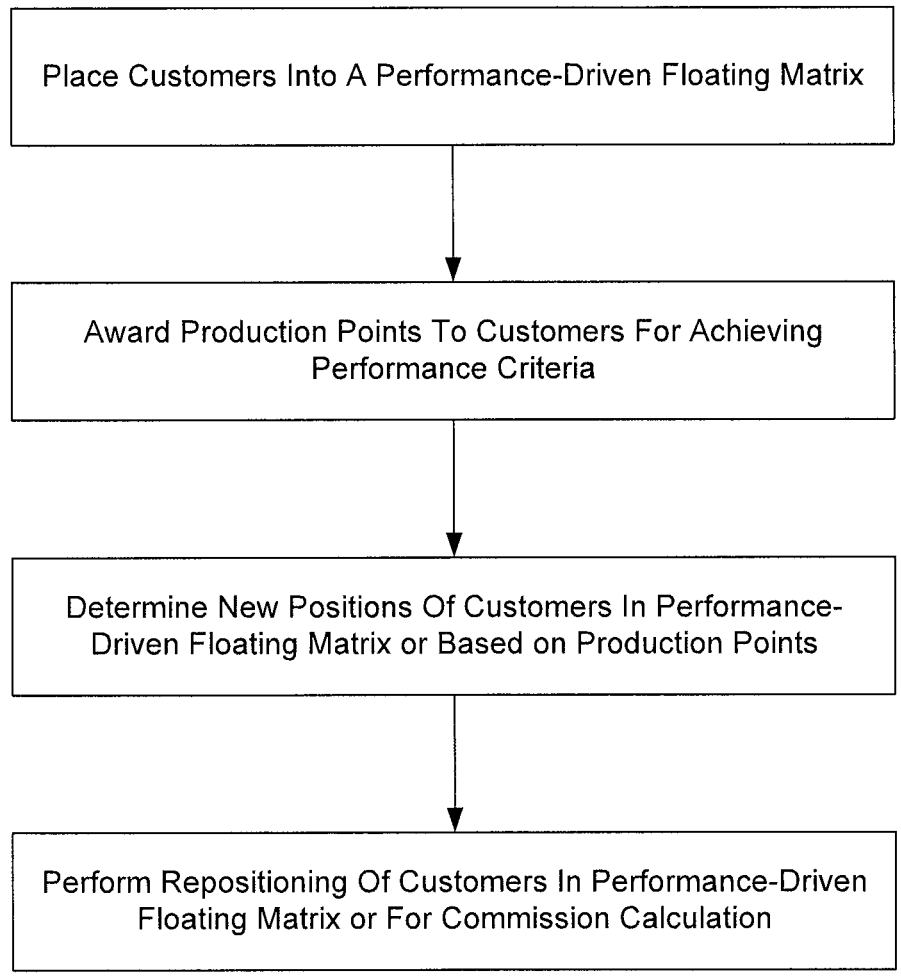
FIG. 1 illustrates a flowchart of a method for awarding Production Points to customers to determine periodic repositioning in a Performance-Driven Floating Matrix.

Some embodiments of the present invention, described with reference to FIG. 1, may comprise placing customers 101 into a Performance-Driven Floating (PDF) Matrix with customers placed according to their Production Points earned that commission period (also referred to herein as "compensation period"). Performance Points may then be awarded 102 to these customers for achieving specified performance criteria. Referring Customer performance may be measured over a period of time, such as a month, for a variety of performance criteria such as sales, training, and enrolling which leads to increased sales. Once the Production Points have been awarded, new positions may then be determined 103 for the customers in the Performance-Driven Floating Matrix based upon the number of Production Points awarded to each customer. When the new positions have been determined, customers may then be repositioned 104 to a new position in the Performance-Driven Floating matrix for calculation of commissions.

Figure 2:
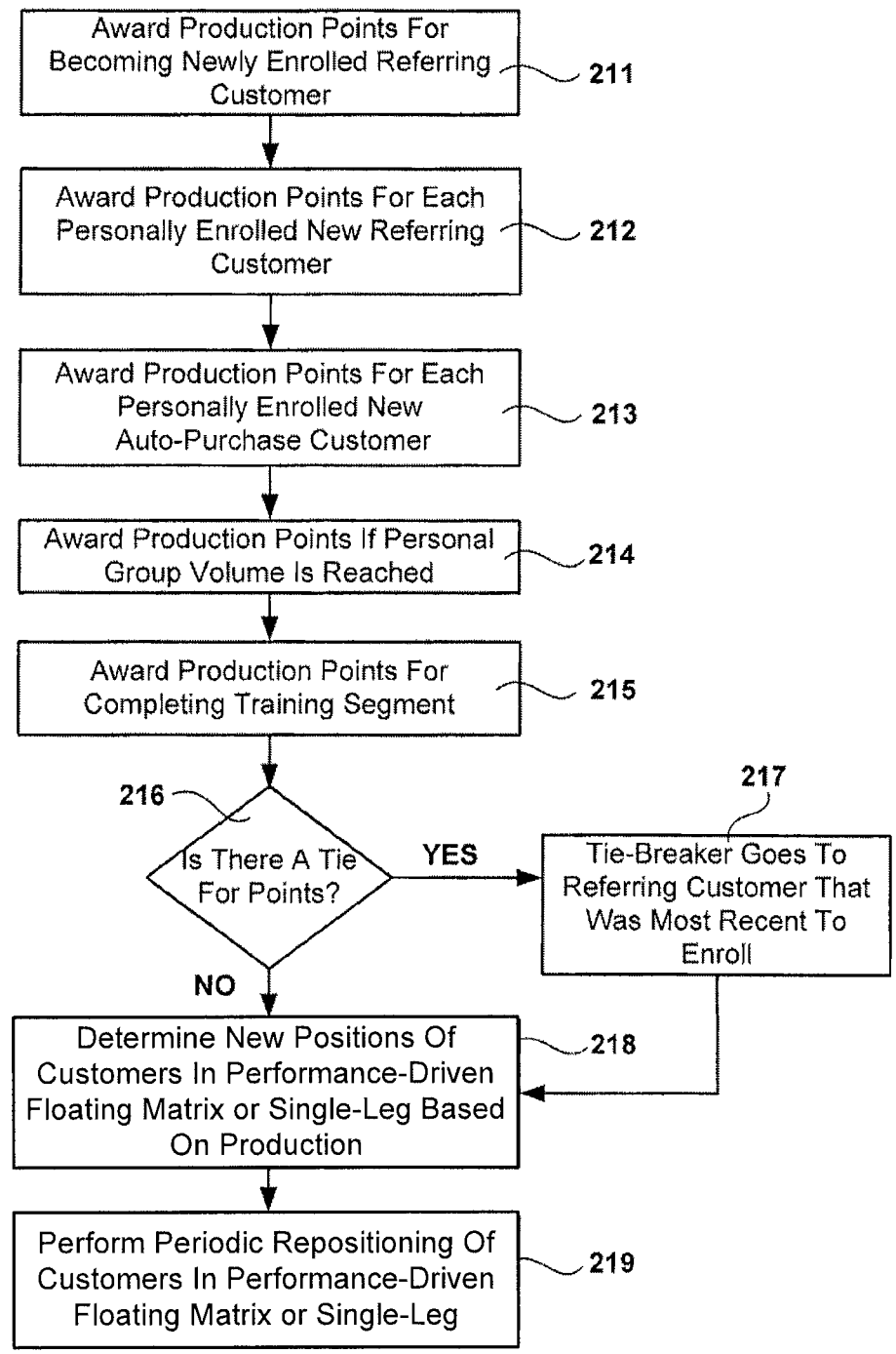
FIG. 2 illustrates a flowchart of a method for awarding Achievement-based Production Points to determine periodic repositioning of Referring Customers in a Performance-Driven Floating Matrix.

In a preferred embodiment of the present invention, described with reference to FIG. 2, Production Points may be awarded 211 for becoming a newly enrolled Referring Customer. These points may be awarded to jump start newly enrolled Referring Customers and encourage them to add additional customers. This may also promote consistency in enrollment as well as continuous retail consumption. In some embodiments, twelve points may be awarded for becoming a Referring Customer. One point may then be deducted each month a customer does not enroll a new Auto-Purchase Customer or Referring Customer. One point may also be awarded for each consecutive month as an Auto-Purchase Customer. These deductions may have limits. For example, new Referring Customers may be given 12 jumpstart points that will be reduced by one point for each month they do not enroll another active customer into the program. The participant may never lose more than the original 12 points over any period of time. If a Referring Customer enrolls one or more customers in any month, the Referring Customer will keep their remaining jumpstart points. If a Referring Customer does not enroll any customers in a month, they will lose one of the original jumpstart points. This process will continue until all 12 jumpstart points have been lost thereby giving new enrollees another opportunity to move up in the marketing plan ahead of those that don't perform.

Production Points may also be awarded 212 for each personally enrolled new Referring Customer. These points continue the emphasis on teamwork for enrolling new retail customers. In some embodiments 5 points may be awarded for each personally enrolled Referring Customer. 3 points may also be awarded for each $2^{nd}$ generation enrollee as Referring Customer, 2 points for each $3^{rd}$ generation enrollee as Referring Customer and 1 point for each $4^{th}$ generation enrollee as Referring Customer.

In some embodiments Production Points may also be awarded 213 for each personally enrolled new Auto-Purchase Customer. These points continue the emphasis on individually enrolling retail customers. This benefits everyone in the program because Auto-Purchase Customers add volume but do not participate in the compensation plan. In some embodiments four points may be awarded for each personally enrolled retail or Auto-Purchase Customer. Production Points may also be awarded 214 for reaching a personal group volume. These points reward team-building accomplishments. In one embodiment, ten points may be awarded for reaching a personal group volume of $25,000. Twenty Production Points may be awarded for reaching a personal group volume of $50,000. Even more points may be awarded for reaching even higher group volumes.

In some embodiments of the present invention, Production Points may also be awarded 215 for completing a segment of a training program. These points give flexibility for a company to promote attendance at various training functions. In some embodiments, one point may be awarded for completing each segment of a training program.

At the end of each compensation period, just prior to the commission run, all the Production Points awarded may be added up to determine 218 the new positions of all customers on the Performance-Driven Floating Matrix. By doing this even new referring customers may by virtue of personal performance move up in the matrix ahead of those that did not perform as well or got in earlier in the same month or even earlier. In the case of a tie for points 216 a tiebreaker 217 may go to the Referring Customer who was most recent to enroll. Once the new positions on the Floating Matrix have been determined 218, a periodic repositioning 219 of Referring Customers in the Floating Matrix may be performed.

Some embodiments of the present invention may comprise two Referring Customer downlines for each Referring Customer. Some embodiments of the present invention, described with reference to FIG. 3A, may comprise a Personally Enrolled Downline 300 or genealogy, which may resemble a traditional multi-level marketing matrix hierarchy. The Personally Enrolled Downline 300 may be used for "qualifications" in the Retail Customer Referral Compensation Program and may comprise a first Referring Customer or Customer 1 301, with a front line or Level 1 303 of customers placed under them. These may be Retail Customers, Auto-Purchase Customers and other Referring Customers that are personally referred by Referring Customer 1 301. In some embodiments there may be no width limits in the Personally Enrolled Downline 300 and a Referring Customer may have an unlimited number of customers in their Personally Enrolled Downline 300 and Referring Customer 1's 301 Front Level or Level 1 303 may have an unlimited number of Retail Customers, Auto-Purchase Customers and Referring Customers that were personally referred by Referring Customer 1 301. In some embodiments the Second Level or Level 2 305 may also comprise an unlimited number of additional Retail Customers, Auto-Purchase Customers and Referring Customers that were personally referred by Referring Customer 1's 301 Front Level or Level 1 303. In some embodiments the third level or Level 3 307 and fourth level or Level 4 309 may also comprise an unlimited number of additional Retail Customers, Auto-Purchase Customers and Referring Customers that were personally referred by Referring Customers in the level above them. The Personally Enrolled Downline 300 may continue down with additional levels and may be as deep as needed to place all of the customers in the Referring Customer's genealogy or Personally Enrolled Downline.

Other embodiments of the present invention may comprise a second, performance-based, Referring Customer downline for each Referring Customer. These embodiments, described with reference to FIG. 3B, may comprise a Performance-Driven Floating Matrix (PDFM) 310, which may also resemble a traditional multi-level marketing matrix hierarchy. In some embodiments, Production Points may be awarded for achieving performance-based criteria and totaled each compensation period for each Referring Customer in the downline. Each Referring Customer may then be assigned a numbered position from highest to lowest depending on the total points earned in the program that compensation period. The Performance-Driven Floating Matrix is then filled, top to bottom, with Referring Customers. The Referring Customers with the highest Productions Points are positioned in the highest positions within the matrix hierarchy and on down the matrix, based on Production Points. As will be shown, in this matrix positioning system, the highest point earners enjoy the benefits of high positions within the matrix, while lower point earners receive fewer benefits.

In some embodiments of the present invention a position within the Performance-Driven Floating Matrix is assigned to each Referring Customer within the company. Positioned are assigned based on the size of number of positions on each level of the matrix and the number of Production Points awarded to each Referring Customer. In some embodiments, the matrix is a binary matrix wherein each level includes a single position and each position includes only one position in its first level downline. In other embodiments, each position in the matrix includes three positions in their first level downline. In yet other embodiments, each position in the matrix includes four or more positions in their first level downline. Each of these embodiments may result in a different number of levels in the entire matrix of the company. For example, a sales system with 1000 Referring Customers will include 1000 levels using a binary matrix, having only one level per downline. Continuing the example, the same sales system will have a matrix with only seven levels when each position in the matrix includes four positions in their first level downline.

Figure 3A:
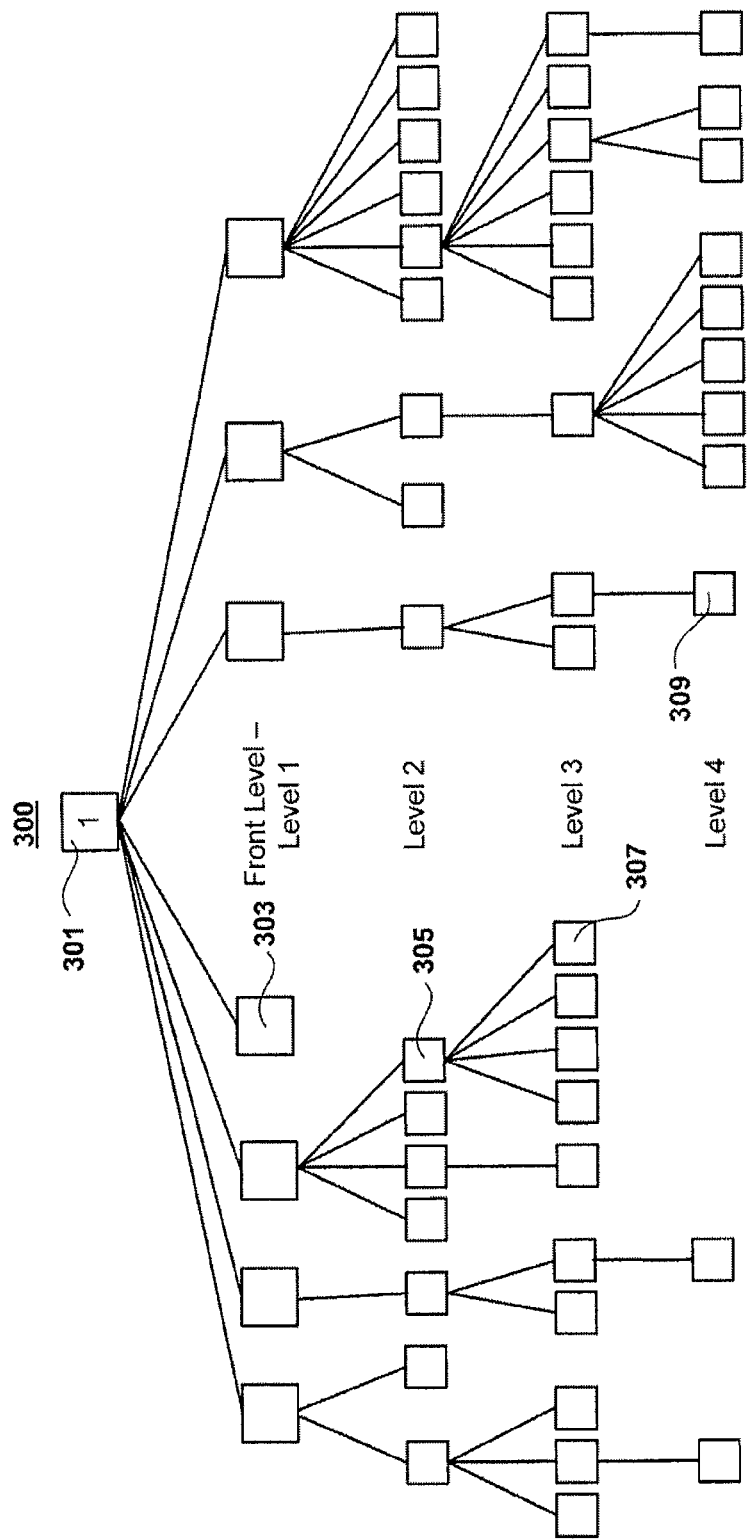
FIG. 3A illustrates a Retail Customer Referral Compensation Program Personally Enrolled Downline (Personal Genealogy) used for qualification purposes.
Figure 3B:
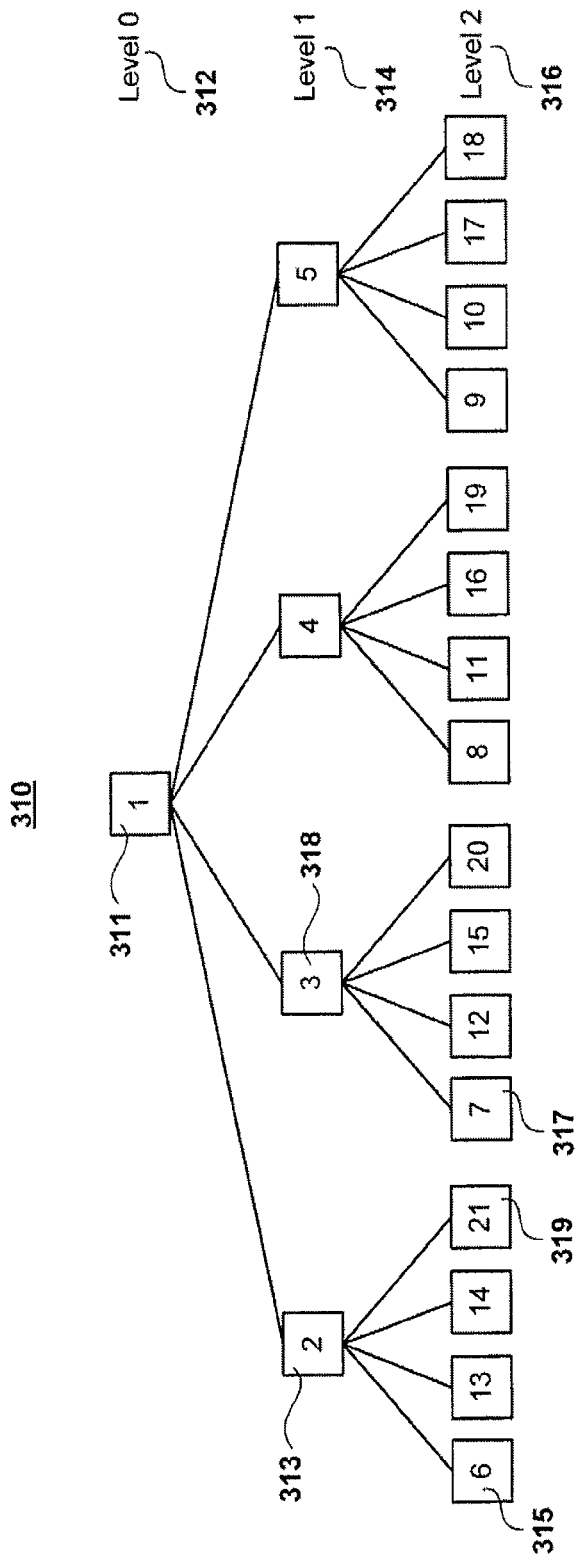
FIG. 3B illustrates a Performance-Driven Floating Matrix Periodic Repositioning based on total points.

With continued reference to FIG. 3B, in one embodiment of a Performance-Driven Floating Matrix 310, with 3 levels and 21 customers may comprise a first Referring Customer or Customer 1 311 on Level 0 312, with the most Production Points earned for that compensation period, and a Level 1 314 placed under Customer 1 311 comprising Referring Customers with less production points for that compensation period placed in order of the amount of Production Points earned, from left to right, with Customer 2 313 having the second most amount of production points. Level 2 316, may comprise 16 additional Referring Customers placed under the Referring Customers in Level 1 314 with 4 Referring Customers placed under each Level 1 Referring Customer in order of the amount of Production Points earned during the Compensation Period. The Referring Customers on Level 2 316 may be placed in consecutive order from left to right, right to left and left to right with Customer 6 315 placed under Customer 2 313 and Customer 7 317, placed under Customer 3 318 and so forth continuing on down to the Referring Customer with the least amount of Production Points for the Compensation Period, Customer 21 319, being placed in the final spot under Customer 2 313.

Figure 4A:
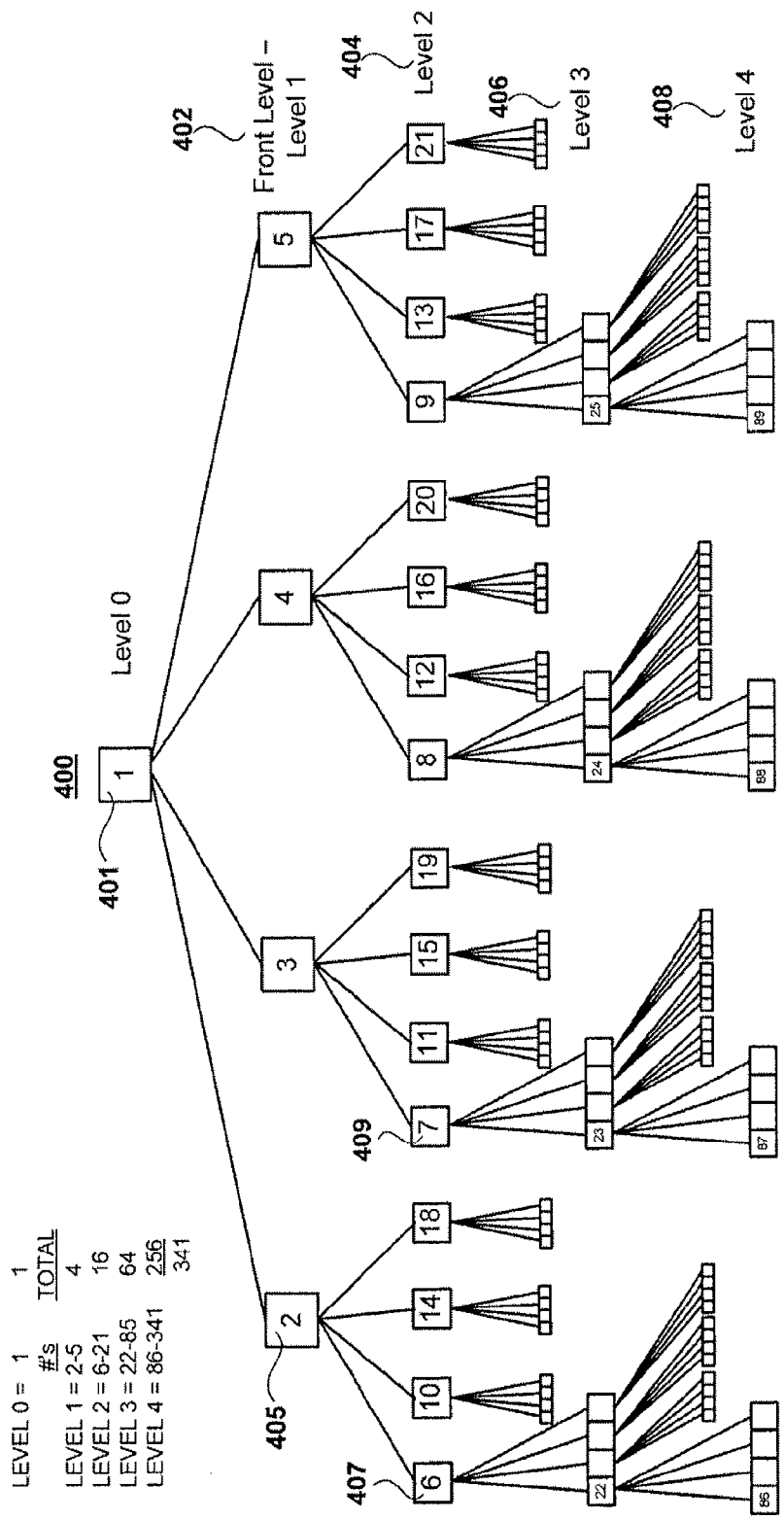
FIG. 4A illustrates a Performance-Driven Floating Matrix before Periodic Repositioning.

Some embodiments of the present invention, described with reference to FIG. 4A, may comprise a Performance-Driven Floating Matrix 400, which may resemble a traditional alternating forced matrix hierarchy utilizing a left to right placement plan for adding newly enrolled Referring Customers. The Performance-Driven Floating Matrix 400 may comprise a first Referring Customer or Customer 1 401, with a front line or Level 1 402 of Referring Customers placed under them with less production points for that compensation period. The front line or Level 1 402 Referring Customers are placed from left to right in the matrix based on production points for that compensation period with the second highest Referring Customer or Customer 2 405 being placed in the first position on the left with additional Referring Customers added to the right until the level is full. A Second Level, or Level 2 404, may comprise additional Referring Customers placed under each of the Level 1 402 Referring Customers. These Level 2 404 Referring Customers may have less production points than the Referring Customers on Level 1. The Level 2 404 Referring Customers may be placed from left to right in the matrix based on production points for that compensation period with the highest Referring Customer in Level 2 or Customer 6 407 being placed in the first position on the left under Customer 2 405 and the second highest Referring Customer in Level 2 or Customer 7 409 being placed in the first position on the left under Customer 3, and so forth. A Third Level, or Level 3 406, may further comprise additional Referring Customers placed under each of the Level 2 404 Referring Customers. A Fourth Level, or Level 4 408, may further comprise additional Referring Customers placed under each of the Level 3 406 Referring Customers in the same left to right order as Level 2. Additional levels may be added as needed. One exemplary embodiment of a 4×4 Performance-Driven Floating Matrix 400, with 4 levels and 341 customers is shown.

Figure 4B:
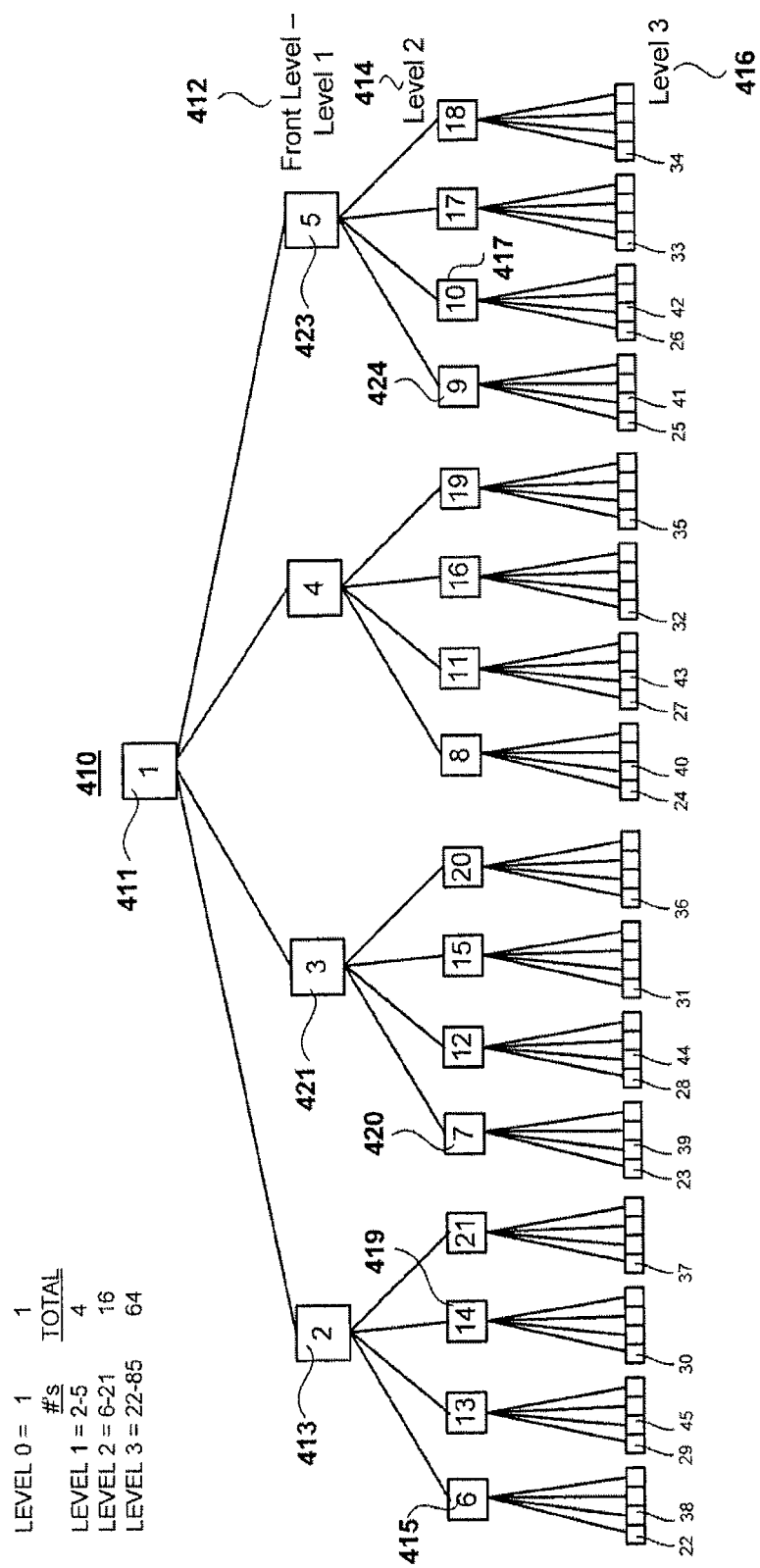
FIG. 4B illustrates a Retail Customer Referral Compensation Program Performance-Driven Floating Matrix with an alternating forced L-R, R-L, L-R, R-L placement.

Some embodiments of the present invention, described with reference to FIG. 4B, may comprise a Performance-Driven Floating Matrix 410, which may resemble a traditional alternating forced matrix hierarchy utilizing a left to right, right to left, left to right and right to left placement plan for placing Referring Customers. The Performance-Driven Floating Matrix 410 may comprise a first Referring Customer or Customer 1 411, with a front line (Level 1) 412 of Referring Customers placed under them. A Second Level, or Level 2 414, may comprise additional Referring Customers placed under each of the Level 1 412 Referring Customers. These Level 2 414 Referring Customers will have less production points than the Referring Customers on Level 1. The Level 2 414 Referring Customers may be placed in an alternating left to right, right to left, left to right and right to left placement plan in the matrix based on production points for that compensation period with the highest Referring Customer in Level 2, or Customer 6 415, being placed in the first position on the left under Customer 2 413 and the second highest Referring Customer in Level 2, or Customer 7 420, being placed in the first position on the left under Customer 3 421, and so forth down the level. Once all the first positions on the left are filled the next Referring Customer will be placed in the second position under the last Referring Customer in the level above. In this example Customer 10 417 is placed in the second position under Customer 5 423 and to the right of Customer 9 424 with Customers 11, 12 and 13 placed in similar fashion moving back to the left with Customer 14 419 being placed in the third spot under Customer 2 413. This alternating left to right, right to left placement pattern may be repeated until Level 2 414 is full. A Third Level, or Level 3 416, may further comprise additional Referring Customers placed under each of the Level 2 414 Referring Customers in a similar alternating left to right, right to left placement pattern. Additional levels may be added as needed.

In some embodiments, the number of positions in the Performance-Driven Floating Matrix is based on the number of products sold during the last compensation period. For example, for example, if 10,000 products were sold during the prior compensation period then 10,000 positions within the Performance-Driven Floating Matrix are available to be filled with Referring Customers who participate in the bonus payout plan. In some embodiments, the positions within the Performance-Driven Floating Matrix designated for the highest Production Point earners are the positions selected to participate in the bonus payout plan. Continuing the example, if 10,000 products are sold in the prior compensation period, then in the current compensation period the top 10,000 positions are designated for the top 10,000 Production Point earners are selected to participate in the bonus payout plan.

In some embodiments, the number of positions in the Performance-Driven Floating Matrix is based on a multiple of the number of products sold during the last compensation period. For example, each of the products sold by a company may be assign a certain number of units. High priced products may be assigned high unit values and low priced products may be assigned higher priced values. When a product is sold the number of units assigned to that product is included in a company tally. At the end of each compensation period the total number of tallied units may represent the number of positions in the Performance-Driven Floating Matrix. However, for simplification purposes, the remaining description and examples will assume that the number of positions in the Performance-Driven Floating Matrix is based on the number of products sold during the last compensation period.

Figure 10:
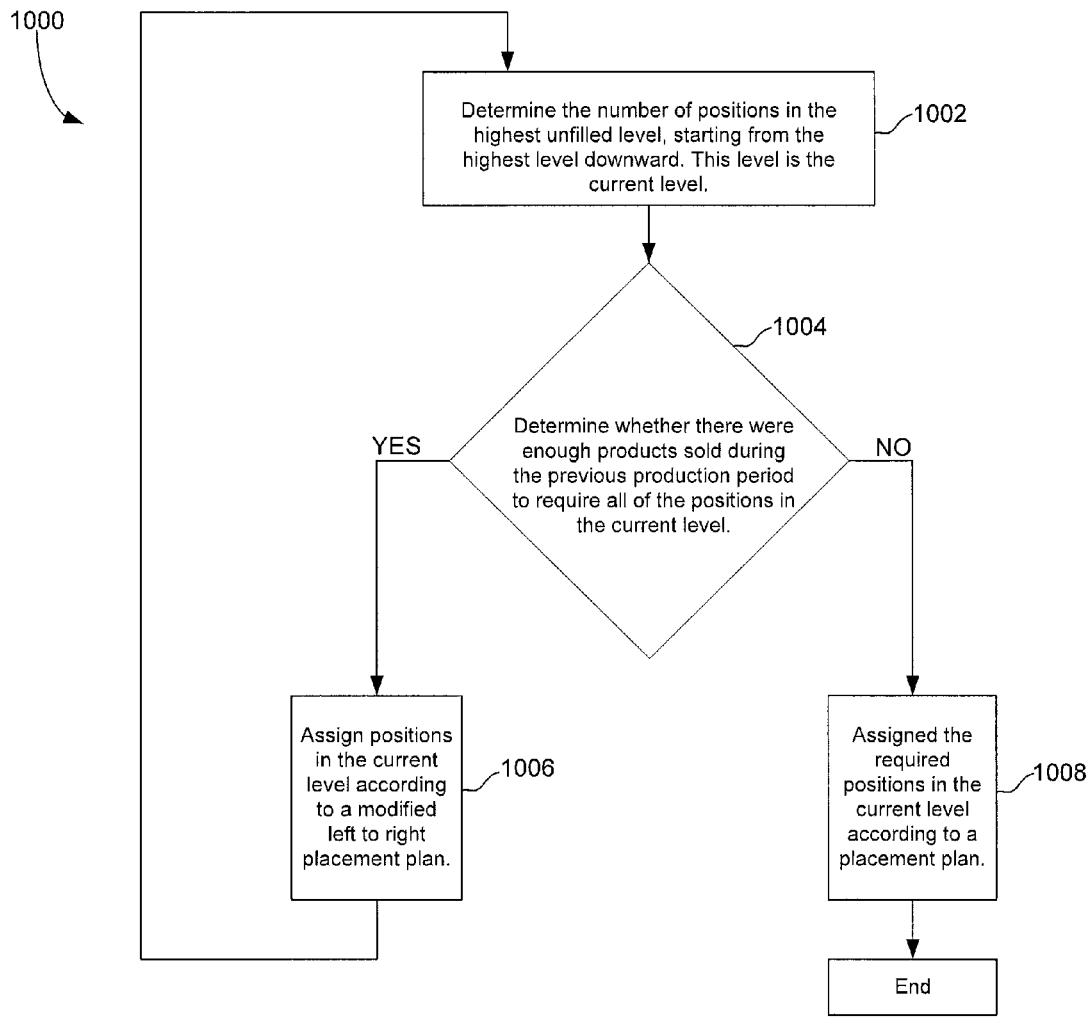
FIG. 10 illustrates a flowchart of a method of positioning Referring Customers with in a Performance-Driven Floating Matrix.

In some embodiments, where the number of positions in the Performance-Driven Floating Matrix is based on the number of products sold thoughout the entire company during the last compensation period, positions within the Performance-Driven Floating Matrix are assigned based on an algorithm, as illustrated generally as 1000 in FIG. 10. First, starting from the highest level downward, the number of positions in the highest unfilled level is determined, this level is the current level 1002. Second, it is determined whether there were enough products sold during the previous compensation period to require all of the positions in the current level 1004. For example, in a matrix wherein each matrix position include four positions in its frontline, such as that illustrated in FIG. 4A, one product must be sold to require all of the position in the first level to be available, five to require all the positions in the second level to be available (because there is one position on the first level and four on the second, summing to five), twenty one to require all of the positions in the third to be available, eighty five for the fourth, three hundred and forty one for the fifth, and so on. If there were sufficient sales, positions are assigned in the current level according to a pure left to right placement plan 1006, as illustrated below in FIG. 11. After a level is filled the process is repeated until it is determined whether there were not enough products sold during the previous compensation period to require all of the positions in the current level 1004. In that case, the required positions in that level are assigned in the current level 1008. In some embodiments, the assignment of positions in this bottom level is according to a left to right, right to left, left to right, right to left placement plan, as illustrated in FIG. 12. In other embodiments, the assignment of positions in the bottom level is according to a left to right placement plan, as illustrated below in FIG. 13.

Figure 11:
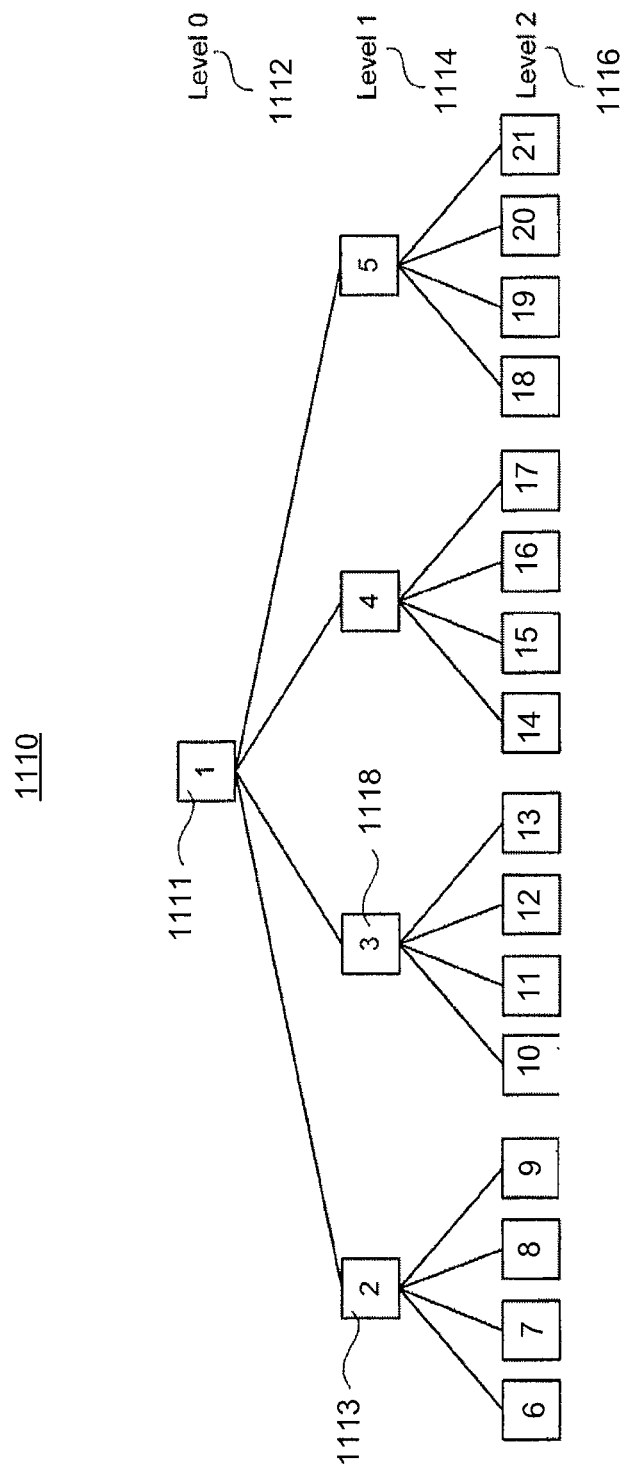
FIG. 11 illustrates another Performance-Driven Floating Matrix Periodic Repositioning based on total points.
Figure 12:
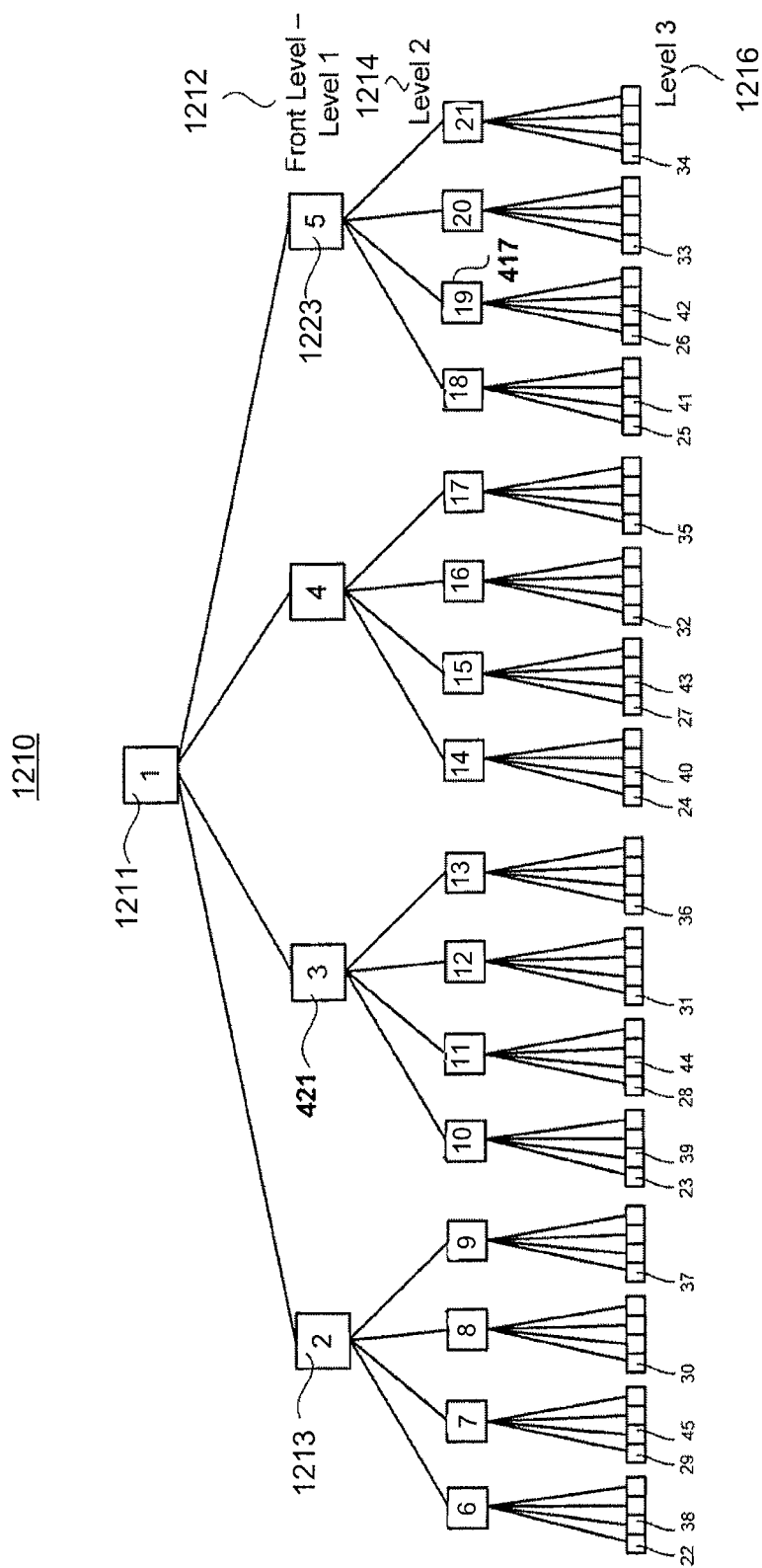
FIG. 12 illustrates another Performance-Driven Floating Matrix Periodic Repositioning based on total points.

FIG. 11 illustrates a Performance-Driven Floating Matrix 1110 having twenty one positions designated for Referring Customers, and filled according to the algorithm 1000 illustrated in FIG. 10. This figure illustrated an embodiment of a Performance-Driven Floating Matrix wherein the bottom level of the matrix is filled based on a pure left to right placement plan, according to step 1006 of the algorithm of FIG. 10. The matrix 1110 shown here limits the frontline of each matrix position to four positions. Accordingly, the width of the matrix is 4. The illustrated matrix has 3 levels, and thus is a 4×3 matrix. The positions within the matrix 1110 are assigned to Referring Customers based on the number of Production Points awarded to each Referring Customer during the last compensation period. Accordingly, the first Referring Customer or Customer 1 1111 on Level 0 1112 earned the most Production Points during the previous compensation period, and a Level 1 1114 placed under Customer 1 1111 comprising Referring Customers with less production points for the previous compensation period placed in order of the amount of Production Points earned, from left to right, with Customer 2 1113 having the second most amount of production points. Level 2 1116, may comprise sixteen additional Referring Customers placed under the Referring Customers in Level 1 1114 with four Referring Customers placed under each Level 1 Referring Customer in order of the amount of Production Points earned during the Compensation Period. The Referring Customers on Level 2 1136 may be placed in position based on a pure right to left placement plan, as illustrated, with Customers 6-9 being placed under Customer 2 1113, Customers 10-13 being placed under Customer 3 1118 and so forth continuing to the Referring Customer with the least amount of Production Points for the prior Compensation Period.

FIG. 12 illustrates an embodiment of a Performance-Driven Floating Matrix 1210 having forty five positions designated for Referring Customers, and filled according to the algorithm 1000 illustrated in FIG. 10. The number of designated positions is determined based on the number of products sold during the previous compensation period. As shown, Levels 1 1212 and 2 1214 of the matrix 1210 are filled based on a pure left to right placement plan, according to step 1006 of the algorithm of FIG. 10 because there were enough designated positions in the matrix to require all of the positions in these levels to be filled. Level 3 1216 is filled based on a left to right, right to left, left to right, right to left placement plan according to step 1006 of the algorithm of FIG. 10 because there were not enough designated positions in the matrix to require all of the positions in this level to be filled. This left to right, right to left, left to right, right to left placement plan is also illustrated in FIG. 4B and described above.

Figure 13:
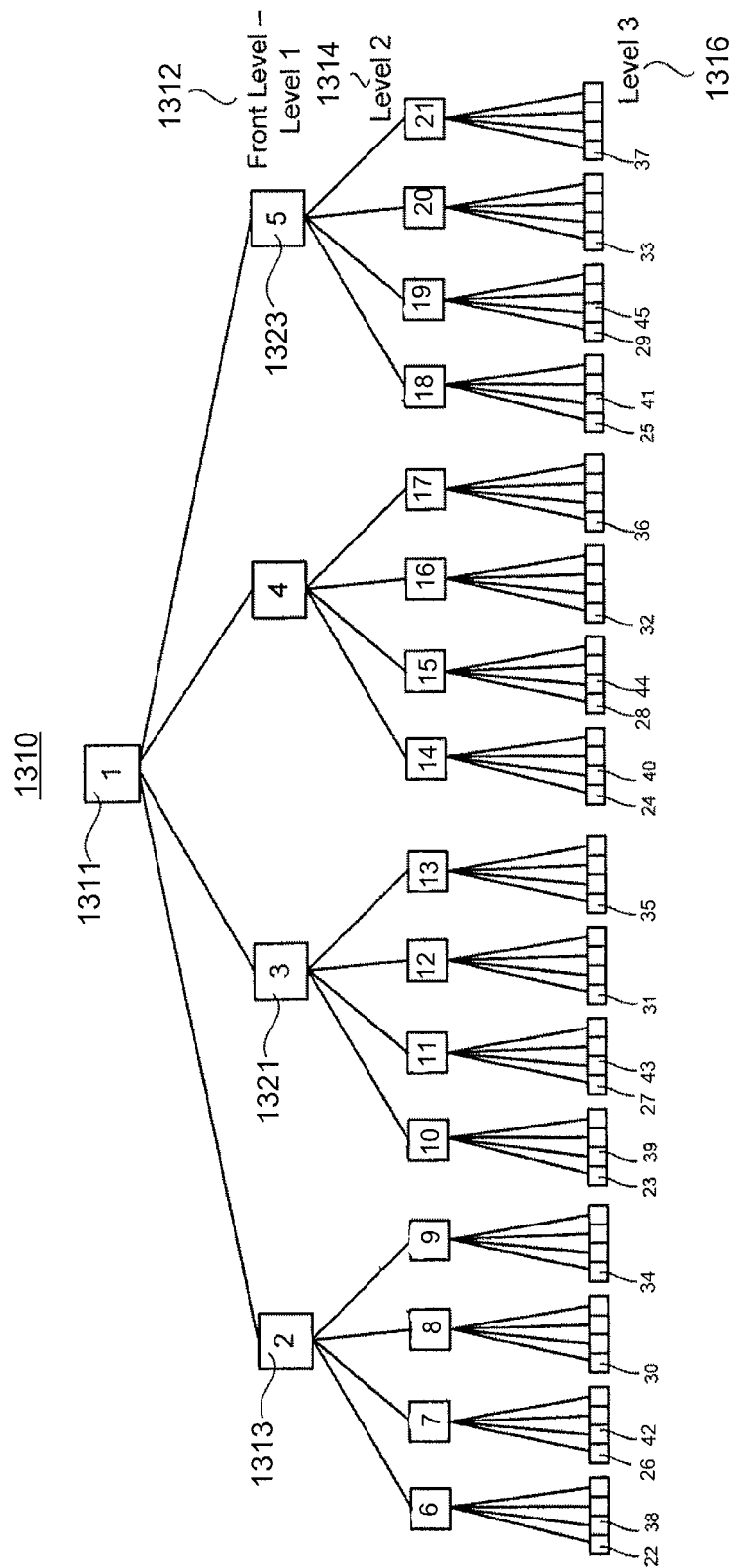
FIG. 13 illustrates another Performance-Driven Floating Matrix Periodic Repositioning based on total points.

FIG. 13 illustrates an embodiment of another Performance-Driven Floating Matrix 1310, similar to that of FIG. 12, having forty five positions designated for Referring Customers, and filled according to the algorithm 1000 illustrated in FIG. 10. As shown, Levels 1 1312 and 2 1314 of the matrix 1310 are filled based on a pure left to right placement plan, according to step 1006 of the algorithm of FIG. 10 because there were enough designated positions in the matrix to require all of the positions in these levels to be filled. FIG. 13 also illustrates that Level 3 1316 is filled based on a left to right placement plan according to step 1006 of the algorithm of FIG. 10 because there were not enough designated positions in the matrix to require all of the positions in this level to be filled. This left to right placement plan is also illustrated in FIG. 4A and described above.

Figure 14:
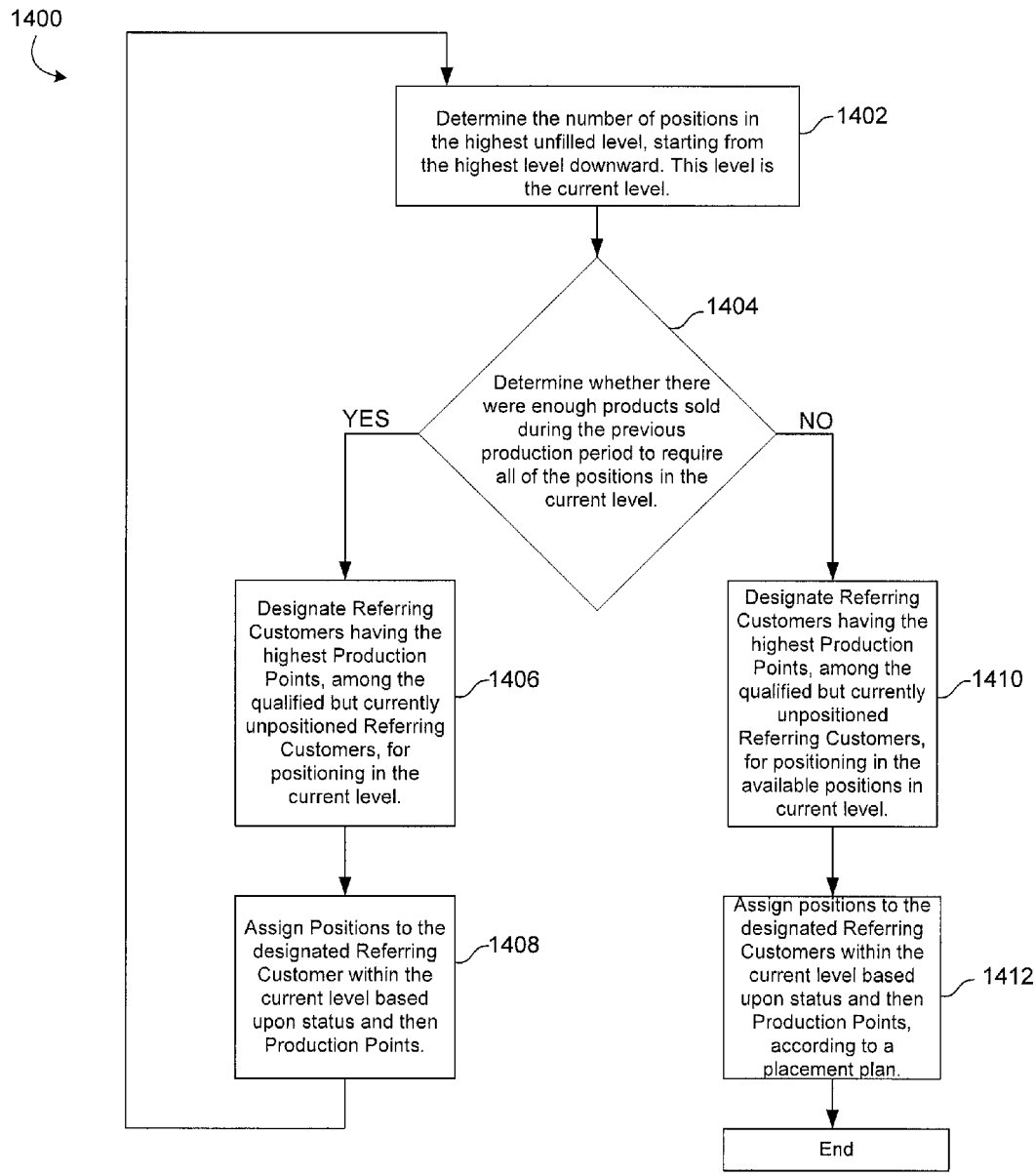
FIG. 14 illustrates a flowchart of a method of positioning Referring Customers with in a Performance-Driven Floating Matrix.

In some embodiments of the present invention, positions within the positioning algorithm, as illustrated generally as 1000 in FIG. 10, is modified such that it will factor in status when positioning Referring Customers. This modified, status-related algorithm 1400 is illustrated in FIG. 14. In some embodiments, a status hierarchy, from highest to lowest, includes Auto Referring Customer, Auto Purchase Customers, Preferred Customers, and then all other participating customers. In other embodiments, any number of different hierarchy configurations may be utilized based on the different status relationships with a company structure. This algorithm begins by starting from the highest level downward, the number of positions in the highest unfilled level is determined, this level is the current level 1402. Next, it is determined whether there were enough products sold during the previous compensation period to require all of the positions in the current level 1404. If there were sufficient sales, the highest Production Point earners among the qualified but currently unpositioned Referring Customers are designated for positioning in the current level 1406. Next, positions are assigned to these designated Referring Customers within the current level based upon status and then Production Points 1408. After a level is filled the process is repeated until it is determined whether there are not enough products sold during the previous compensation period to require all of the positions in the current level 1404.

An example will illustrate step 1408 of FIG. 14. Suppose five Referring Customers are designated for positioning within the current level. Suppose further that Customer A is an Auto Referring Customer with 10 Production Points; Customer B is also an Auto Referring Customer with 8 Production Points; Customer C is an Auto Purchasing Customer with 11 Production Points; Customer D is also an Auto Purchasing Customer but with 12 Production Points; Customer E is a Preferred Customer with 11 Production Points. In step 1408, the positions are assigned to these customers based first upon their status, and then their Production Points. According to the hierarchy, the Auto Referring Customers A and B are positioned in the highest positions, despite the fact that they do not have the highest number of Production Points out of the five customers. Based upon their Production Points, Customer A is positioned in the highest position and Customer B in the next highest position. Following this formula, Customer D is positioned in the next highest position, followed by Customer C and then Customer E.

With continued reference to FIG. 14, step 1410, when there are not enough products sold during the previous compensation period to require all of the positions in the current level, only the required positions in that bottom level are assigned in the current level. Positions within this bottom level are designated to highest Production Point earners among the qualified but currently unpositioned Referring Customers 1410. The positions are assigned to these designated Referring Customers within the current level based upon status and then Production Points 1412. The designated positions in the bottom level may be selected based upon various placement plans, such as the left to right placement plan or the left to right, right to left, left to right, right to left placement plan.

In some cases during the positioning of Referring Customers in a Performance-Driven Floating Matrix, some Referring Customers may have earned the same number of Production Points during the previous compensation period. In this case, a tie-breaker may be necessary in order to assign Referring Customers to a position within the Performance-Driven Floating Matrix. In some embodiments, ties may be resolved based on the status of the Referring Customers. In some embodiments, Referring Customers having a higher status will be placed in higher position than Referring Customers having a lower status. In some embodiments, a status hierarchy, from highest to lowest, includes Auto Referring Customer, Auto Purchase Customers, Preferred Customers, and then all other participating customers. In some embodiments, ties are resolved based on which Referring Customer had the most Production Points in the penultimate compensation period. In some embodiments, ties are resolved based on the Referring Customer's position within the Personally Enrolled Downline, as illustrated in FIG. 3A.

In some embodiments of the present invention, a periodic repositioning of Referring Customers in the Performance-Driven Floating Matrix may be performed and positions may be determined based upon Production Points awarded in the plan before every commission run. Production Points may be awarded based on performance criteria that produce sales and production such as enrolling in an Auto-Purchase Program, signing-up customers on an Auto-Purchase Program, a Referring Customer's Personal Genealogy downline such as personally enrolling other Referring Customers, the number of Personally Enrolled Second Level Customers, the number of Personally Enrolled Third Level Customers, the number of Personally Enrolled Fourth Level Customers, as well as Total Group Volume. In an exemplary embodiment, described with reference to FIG. 5A, a Referring Customer may be awarded Production Points based on performance criteria 501 that produce sales and production in a given compensation period. New Referring Customers may be awarded twelve "Jumpstart" points for signing-up on an Auto-Purchase Program that will be reduced by one point for each month they do not enroll another active customer into the program. The Referring Customer may never lose more than the original twelve points over any period of time. If the new Referring Customer enrolls one or more new active customers in any month they may keep their remaining jumpstart points. If the new Referring Customer has no new enrollees in any month they lose one of the original jumpstart points. This process may continue until all twelve jumpstart points have been lost, thereby giving new people another opportunity to move up in the marketing plan ahead of those that don't perform. A new Referring Customer may also be awarded one Production Point for each consecutive month they are personally enrolled in the Auto-Purchase Program. These are the only points in the plan that may accumulate. If the Referring Customer cancels his Auto-Purchase they will lose all points accumulated. This rewards activity and commitment and helps new Referring Customers advance in the plan.

In another exemplary embodiment, a Referring Customer may be awarded Production Points for achieving different performance criteria 503 in a given month. For example, 12 points may be awarded for signing-up on an Auto-Purchase Program, 15 Points may be awarded for having 3 Personally Enrolled Enrolling Customers (5 points each), 15 Points may be awarded for having 5 Personally Enrolled Second Level Customers (3 points each), 20 Points may be awarded for having 10 Personally Enrolled Third Level Customers (2 points each) for a total of 62 total monthly Production Points. In another exemplary embodiment, a Referring Customer may be awarded Production Points for achieving performance criteria 505 in a given month. In one embodiment, 12 points may be awarded for signing-up on an Auto-Purchase Program with an additional 3 points awarded for remaining an Auto-Purchase Customer for 3 consecutive months (1 point each per month). An additional 25 Points may be awarded for having 5 Personally Enrolled Enrolling Customers (5 points each), 45 Points may be awarded for having 15 Personally Enrolled Second Level Customers (3 points each), 40 Points may be awarded for having 20 Personally Enrolled Third Level Customers (2 points each), and 18 Points may be awarded for having 18 Personally Enrolled Fourth Level Customers (1 point each). An additional 20 Production Points may also be awarded for having 5 Personally Enrolled Retail or Auto-Purchase Customers (4 points each) for a total of 163 monthly Production Points.

In still another exemplary embodiment, another Referring Customer may be awarded even more Production Points for achieving additional performance criteria 507 in a given month. For example, 12 points may be awarded for signing-up on an Auto-Purchase Program with an additional 8 points awarded for remaining an Auto-Purchase Customer for 8 consecutive months (1 point each per month). An additional 50 Points may be awarded for having 10 Personally Enrolled Enrolling Customers (5 points each), 150 Points may be awarded for having 50 Personally Enrolled Second Level Customers (3 points each), 500 Points may be awarded for having 250 Personally Enrolled Third Level Customers (2 points each), 400 Points may be awarded for having 400 Personally Enrolled Fourth Level Customers (1 point each) and 10 Points may be awarded for having a $25,000 personal group volume for a total of 1130 monthly Production Points.

In some embodiments of the present invention Production Points may also be awarded for training and attendance at company sponsored events. Points may be awarded for attending a training class and completing a test upon completion. Different point values may be awarded depending on the complexity and importance of the course.

Figure 5B:
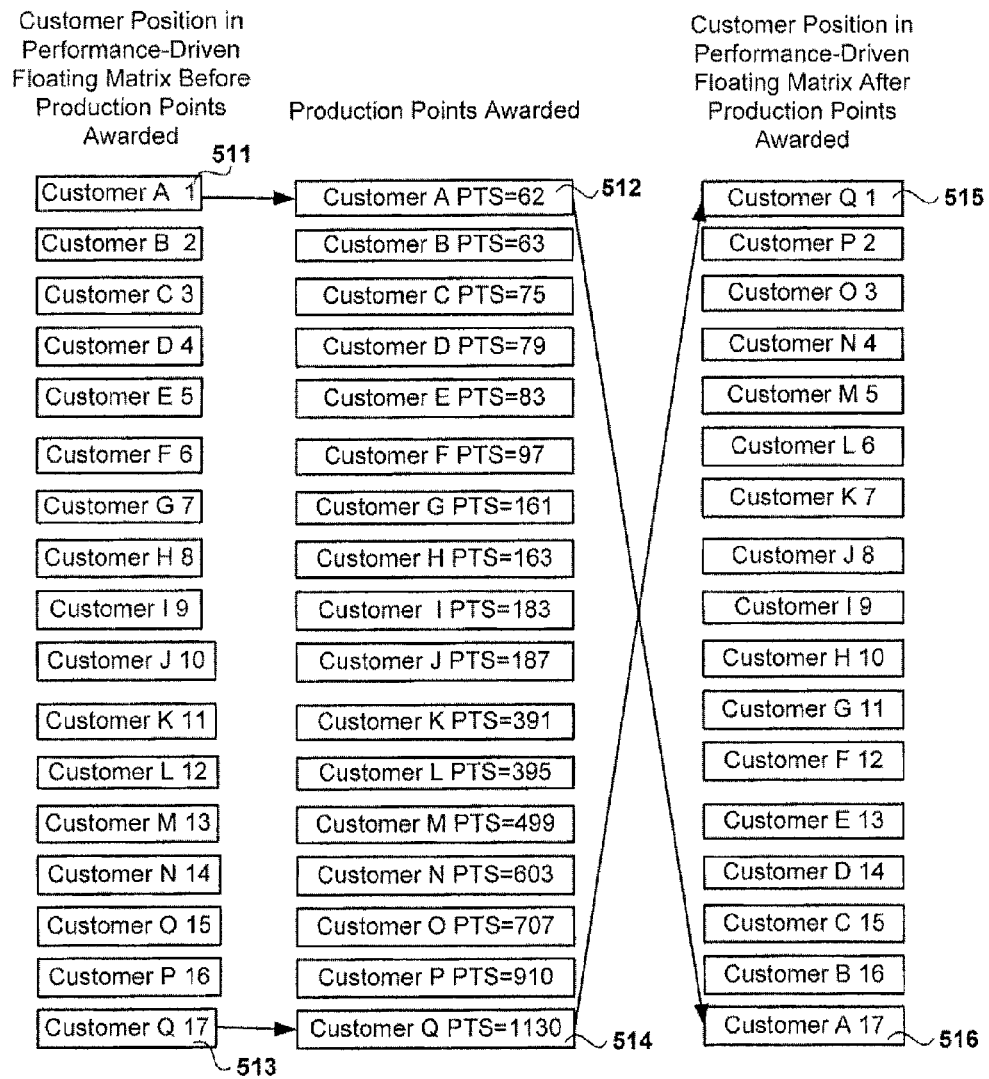
FIG. 5B illustrates an exemplary periodic repositioning of Referring Customers in a Performance-Driven Floating Matrix from application of customer awarded Production Points.

In some embodiments, described with reference to FIG. 5B, Referring Customer "A" 511 may be awarded a total of 62 Production Points 512 for the compensation period. Another Referring Customer, Customer "Q" 513 may be awarded a total of 1130 Production Points 514 in the same compensation period. After having been awarded the most Production Points for the compensation period, Customer "Q" 513, who was awarded 1130 Production Points 514, would be relocated to the number 1 position 515 in the Performance-Driven Floating Matrix. Customer "A" 511, who was awarded 62 Production Points 512, the least amount for the compensation period, would therefore be relocated to the last position 516 in the Performance-Driven Floating Matrix. The other Referring Customers would also be relocated similarly within the Performance-Driven Floating Matrix according to the amount of Production Points awarded and the placement plan used.

Figure 6:
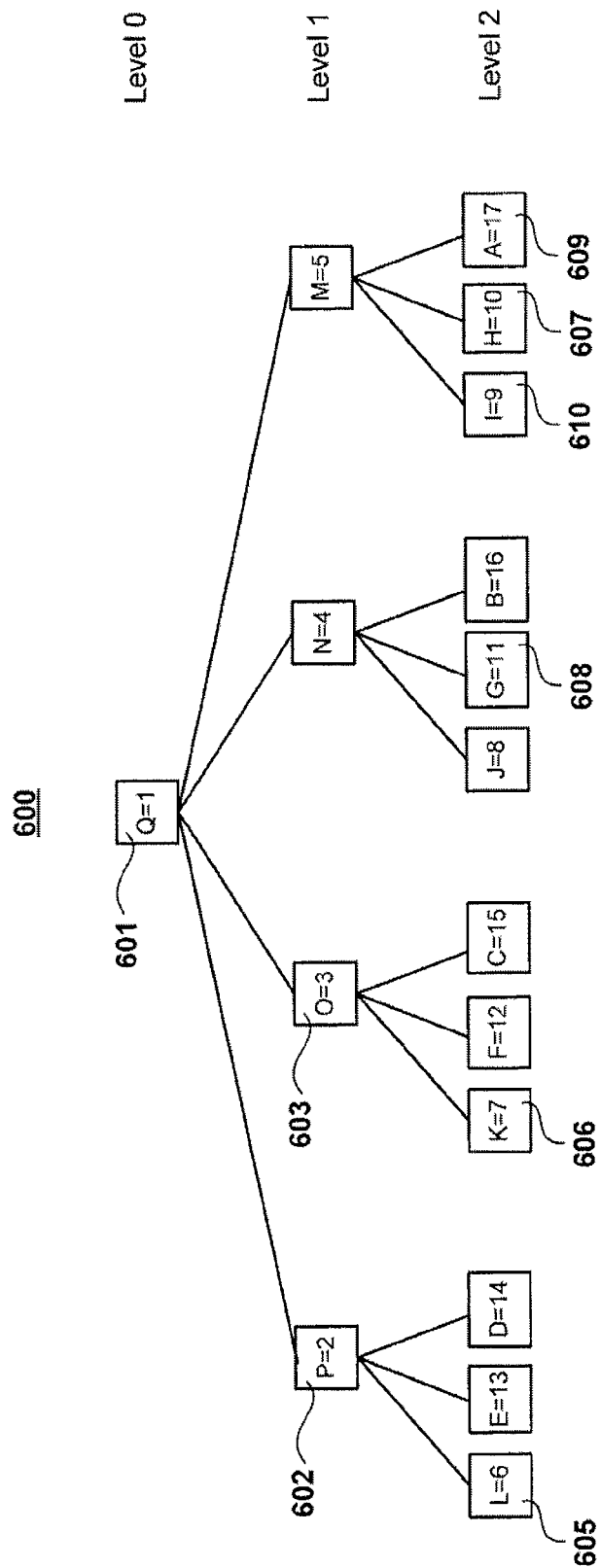
FIG. 6 illustrates an exemplary Performance-Driven Floating Matrix after repositioning from application of Production Points.

Some embodiments of the present invention, described with reference to FIG. 6, may comprise a Repositioned Performance-Driven Floating Matrix 600 with Customer "Q" relocated to the number 1 position 601 of the matrix. Other customers in the Repositioned Performance-Driven Floating Matrix 600 may now also occupy new positions based upon Production Points earned in the compensation Period and may now comprise a new front line or Level 1 of participating customers with Customer "P" 602 with the second highest amount of Production Points, now occupying the first position on the front level, or Level 1, beneath Customer "Q" 601 and Customer "O" 603, with the third highest amount of Production Points, occupying the second position on Level 1 continuing on until Level 1 is filled. Referring Customers may then be placed on the next level down or Level 2 with the Referring Customer with the next highest amount of Production Points, such as Customer "L" 605, now occupying the first position on the next level, Level 2, beneath Customer "P" 602 and Customer "K" 606 occupying the first position to the left beneath Customer "O" 603. In some embodiments, the left to right, right to left placement method may be used such that Customer "H" 607, with more Production Points than Customer "G" 608, may be placed in the second position to the right of Customer "I" 610 in Level 2. Customer "A" 609, who was awarded the least amount of Production Points during the compensation period, may now occupy the last position on Level 2 in the Repositioned Performance-Driven Floating Matrix 600.

In some embodiments of the present invention, Participants may generate retail commissions through product sales for the Referring Customer who personally enrolled them in the plan. In one exemplary embodiment, with a product wholesale price of $30, a Personal Enroller may earn a $10 commission for each $40 product sold to a personally enrolled retail customer and a $5 retail commission for each $35 product sold to a personally enrolled referring or retail customer.

In some embodiments of the present invention, retail commissions may be earned each month for the activity of personally sponsored customers and a Referring Customer's personally enrolled genealogy may earn them additional points. These additional points may be needed in order to qualify for the compensation plan's bonus pools. In some embodiments, one bonus pool may require 25,000 points and another may require 50,000 points. In order to prevent these bonus pools from being too easily attained, in some embodiments points may only be earned through a limited number of personally sponsored generation levels. In some embodiments points may only be earned through 5 personally sponsored generation levels while in others points may be limited to 10, 20 or an unlimited amount of personally sponsored generations depending on the bonus pool attainment goals and difficulty desired. Other qualifications, such as point requirements, may also be adjusted as needed.

In one exemplary embodiment of the present invention, a bonus pool may require 25,000 points while another bonus pool may require 50,000 points to qualify. Points may only be earned through 5 personally sponsored generation levels. If a Referring Customer personally sponsored four other Referring Customers on their front line or first level and each subsequent Referring Customer sponsored 4 more Referring Customers on their front lines through the 5 generation levels the original Referring Customer would have a personal genealogy with 4 customers on the first level, 16 customers on the second level, 64 customers on the third level, 256 customers on the fourth level and 1024 customers on the fifth level for a total of 1364 customers. If all 1364 customers bought one product in a month with a wholesale price of $30 the total volume for the original Referring Customer would be $40,920. If one point were awarded for each dollar in volume the original Referring Customer would earn 40,920 points, which would qualify him for the 25,000 point bonus pool but not for the 50,000 point bonus pool.

Some embodiments of the present invention may comprise Global Matching Bonus Pools. In some embodiments, the Global Matching Bonus Pools may be shared on a periodic basis with qualified Referring Customers. The Global Matching Bonus Pools may be made up from the total wholesale volume of the Retail Customer Referral Compensation Program. In some embodiments of the present invention the Global Matching Bonus Pools may comprise different individual matching bonus pools with the first matching bonus pool paying a certain percent bonus to participating Referring Customers. A Referring Customer may participate in some of the Matching Bonus Pools one time only. To participate, a Referring Customer may have to have a certain number of personally enrolled active customers below them. The share of the personally enrolled active customer may be split with their qualified personal enroller or the next qualified upline Referring Customer following the personal enroller genealogy. Some embodiments may also comprise another Matching Bonus Pool, which may pay an additional percent bonus. To participate, a Referring Customer may need a greater number of personally enrolled active Referring Customers below them in their downline. The periodic share of the participating personally enrolled active Referring Customers will be split with their qualified personal enroller or the next qualified upline personal enroller following the personal enroller genealogy.

Some embodiments may comprise still another Matching Bonus Pool, which may pay an additional percent bonus. A Referring Customer may participate in this Matching Bonus Pool repeatedly. To participate, a Referring customer may need to have a set number of personally enrolled active customers below them in their downline and have reached a specified dollar volume in personally enrolled group Auto-Purchase volume, plus be actively qualified in the company's standard compensation plan. This shared bonus may be based on Pro-Rata of total personal group volume. This bonus pool may also be added to the other Matching Bonus Pools until a member qualifies. The monthly share of the participating Referring Customer may be split with their qualified personal enroller or the next qualified upline Referring Customer following the personal enroller genealogy.

Some embodiments of the present invention may comprise yet another Matching Bonus Pool, which may pay an additional percent bonus. A Referring Customer may participate in the Matching Bonus Pool repeatedly. To participate, a Referring Customer may have to achieve a set number of personally enrolled active Referring Customers below them in their downline and have a reached an even higher specified dollar amount in personally enrolled group Auto-Purchase volume, plus be actively qualified in the company's standard compensation plan. This shared bonus may be based on Pro-Rata of total personal group volume. This bonus pool may also be added to another Matching Bonus Pool until a member qualifies. The share of the participating Referring Customer may be split with their qualified personal enroller or the next qualified upline Referring Customer following the personal enroller genealogy.

In one preferred embodiment of the present invention, the Global Matching Bonus Pools may comprise 4 different individual levels or matching bonus pools with the first matching bonus pool paying a 2 percent bonus to participating Referring Customers. A Referring Customer may participate in the first Matching Bonus Pool one time only. To participate, a Referring Customer must have 4 personally enrolled active Referring Customers below them. The monthly share of the participating Referring Customer will be split with their qualified personal enroller or the next qualified upline Referring Customer following personal enroller genealogy. Embodiments of the present invention may also comprise a second Matching Bonus Pool, which may also pay a 2 percent bonus. A Referring Customer may participate in the second Matching Bonus Pool only one time. To participate, a Referring Customer must have 8 personally enrolled active Referring Customers below them in their downline. The monthly share of the participating Referring Customer will be split with their qualified personal enroller or the next qualified upline Referring Customer following personal enroller genealogy.

Embodiments of the present invention may also comprise a third Matching Bonus Pool, which may pay a 4 percent bonus. A Referring Customer may participate in the third Matching Bonus Pool repeatedly every month. To participate, a Referring Customer must have a set number of personally enrolled active Referring Customers below them in their personal genealogy, (in an exemplary 4×4 matrix a Referring Customer must have 8 personally enrolled active Referring Customers below them) in their downline and have reached a specified volume, such as $25,000, in personally enrolled group Auto-Purchase volume plus be actively qualified in the company's standard compensation plan. This shared bonus is based on Pro-Rata of total personal group volume. This bonus pool is added to the second Matching Bonus Pool until a member qualifies. The monthly share of the participating Referring Customer will be split with their qualified personal enroller or the next qualified upline Referring Customer following personal enroller genealogy.

Some embodiments of the present invention may also comprise a fourth Matching Bonus Pool, which may pay an additional 4 percent bonus. A Referring Customer may participate in the fourth Matching Bonus Pool 440 repeatedly every month. To participate, a Referring Customer must have a set number of personally enrolled active Referring Customers below them, (in an exemplary 4×4 matrix a Referring Customer must have 8 personally enrolled active Referring Customers below them) in their downline and have a reached a higher specified volume, such as $50,000, in personally enrolled group Auto-Purchase volume plus be actively qualified in the company's standard compensation plan. This shared bonus is based on Pro-Rata of total personal group volume. This bonus pool is added to either the second or third Matching Bonus Pools until a member qualifies. The monthly share of the participating Referring Customer will be split with their qualified personal enroller or the next qualified upline Referring Customer following personal enroller genealogy.

Other embodiments of the present invention may comprise a Personal Enroller Matching Bonus payout plan with Dynamic Compression wherein 100% of distribution of commissions for commissionable volume after retail profit is moved to the next available qualified position if a Referring Customer does not qualify. The Dynamic Compression of the Personal Enroller Matching Bonus payout plan maximizes a Referring Customer's payout so that when qualifications aren't met all available unpaid commissions are automatically "compressed" and rolled-up the line to the next qualified Referring Customer in order to maximize their payout instead of going back to the company.

Figure 7:
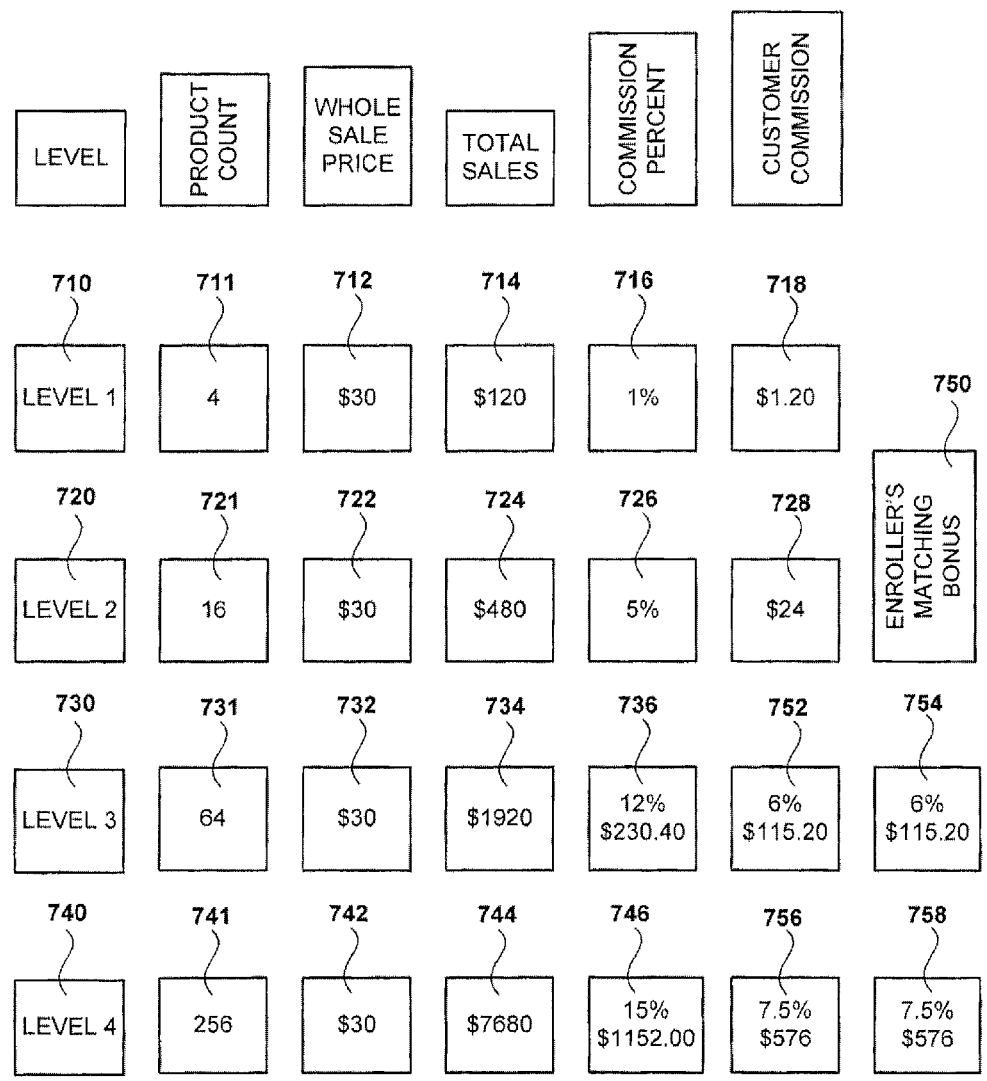
FIG. 7 illustrates a preferred embodiment of a Retail Customer Referral Compensation Program commission and bonus payout plan with a Personal Enroller Matching Bonus.

FIG. 7 illustrates an embodiment of a wherein a Referring Customer is positioned in a Floating Matrix based on the number of Production Points they earned in the previous compensation period. According to this plan, a Referring Customer is entitled to be compensated based on their position within the 4×4 Performance-Driven Floating Matrix.

In a 4×4 Performance-Driven Floating Matrix plan each Referring Customer is capable of receiving a commission for Referring Customers on their first four levels. For example, FIG. 7 illustrates the commission structure for a Referring Customer in a Performance-Driven Floating Matrix plan having at least four levels below her in the matrix. In a 4×4 matrix, the Referring Customer is limited to 4 Referring Customers on their Front Line or first level. Likewise, each Referring Customer on the first level has a maximum of four people on their first level. Accordingly, in a 4×4 matrix, there is a maximum of 16 people on a Referring Customer's 2nd Level, and so on until your organization reaches a depth of 4 Levels Additional customers are moved down to the first available position and automatically added, following one of the placement plans explained above, until the level is filled. In a full 4×4 matrix this would provide for a second level with 16 Referring Customers, a third level with 64 Referring Customers and a fourth level with 256 Referring Customers. All active Referring Customers may be qualified for payout on the first two levels. To qualify for payout on Levels 3 and 4 a Personal Enroller must have the corresponding number of personally sponsored Referring Customers. If the Personal Enroller does not qualify, the matching bonus rolls up to the first qualified personal enroller, following personal enroller genealogy.

In some embodiments of the present invention, described with reference to FIG. 7, a product has a retail price of $40, a discounted Auto-Purchase price of $35, and a wholesale price of $30. In this embodiment, a Referring Customer earns a $5 retail commission on each personally sponsored Auto-Purchase sale and $10 retail commission on each personally sponsored retail sale. The remaining $30 wholesale price is revenue that is commissionable in a bonus payout plan.

In some embodiments, the sum of all remaining wholesale revenue in an entire business network is utilized in a bonus payout plan. For example, in some embodiments, as illustrated in FIG. 10, a company can identify the number of units, or products, sold within the company, during the last compensation period 1002. Next, the business network designates a bonus position within the Performance-Driven Floating Matrix to participate in a bonus payout plan for each product sold during the prior compensation period 1004. For example, if 1,000 products were sold during the prior compensation period then 1,000 positions within the Performance-Driven Floating Matrix are selected to participate in the bonus payout plan. In some embodiments, the positions within the Performance-Driven Floating Matrix designated for the highest Production Point earners are the positions selected to participate in the bonus payout plan. Continuing the example, if 1,000 products are sold in the prior compensation period, then in the current compensation period the top 1,000 positions designated for the top 1,000 Production Point earners are selected to participate in the bonus payout plan. Lastly, Referring Customers positioned in bonus compensation positions are compensated according to a compensation and bonus plan 1006, such as that detailed in FIG. 7, which will now be discussed.

FIG. 7 illustrates one embodiment of how wholesale revenue from within a business network is distributed via a bonus payout plan. This embodiment assumes that each of the four levels illustrated are filled with a Referring Customer, and that each of the four levels 710, 720, 730, and 740 include positions selected to participate in the bonus payout plan. As show, the bonus payout plan includes a Level 1 710 payout of $1.20 718 based on a product count of 4 711 and a wholesale price of $30 712 for a total sales volume of $120 714 and a Level 1 commission of 1% 716. The bonus payout plan comprise a Level 2 720 payout of $24 728 based on a product count of 16 721 and a wholesale price of $30 722 for a total sales volume of $480 724 and a Level 2 commission of 5% 726.

As further illustrated in FIG. 7, the bonus plan also comprises a Level 3 730 payout of $230.40 736 based on a product count of 64 731 and a wholesale price of $30 732 for a total sales volume of $1920 734 and a Level 3 commission of 12% 736 which may be split with the Referring Customer's Personal Enroller. As explained above, the Referring Customer's Personal Enroller is the person who enrolled the Referring Customer. For a Personal Enroller to qualify for a matching Enroller Bonus of 6% 754 on Level 3, they must also have the corresponding number of personally enrolled Referring Customers. If the Personal Enroller does not qualify the matching bonus rolls upline in the matrix to the first personally enrolled upline Referring Customer that qualifies following personal enroller genealogy.

The bonus payout plan of FIG. 7 also comprises a Level 4 740 payout of $1152 746 based on a product count of 256 741 and a wholesale price of $30 742 for a total sales volume of $7,680 744 and a Level 4 commission of 15% 746 which may be split with the Referring Customer's Personal Enroller. For a Personal Enroller to qualify for a matching Enroller Bonus 758 of 7.5% on Level 4, they must have the corresponding number of personally enrolled Referring Customers. If the Personal Enroller does not qualify, the matching bonus rolls up the matrix to the first personally enrolled upline Referring Customer that does qualify following personal enroller genealogy.

In summation, FIG. 7 illustrates one embodiment of a Performance-Driven Floating Matrix plan, wherein a Referring customer is capable of receiving compensation within a compensation period for the persons in her lower four levels within the Performance-Driven Floating Matrix. In addition, the Referring customer can receive additional compensation if she is a Personal Enroller and if she and the person enrolled qualify for a matching bonus. Accordingly, this plan encourages Referring Customers to consistently earn Production Points, so that after each compensation period she is positioned high within the Performance-Driven Floating Matrix, having many persons in lower levels than she, and so that she qualifies for Matching Bonuses, as described above and illustrated in FIG. 7.

Figure 8:
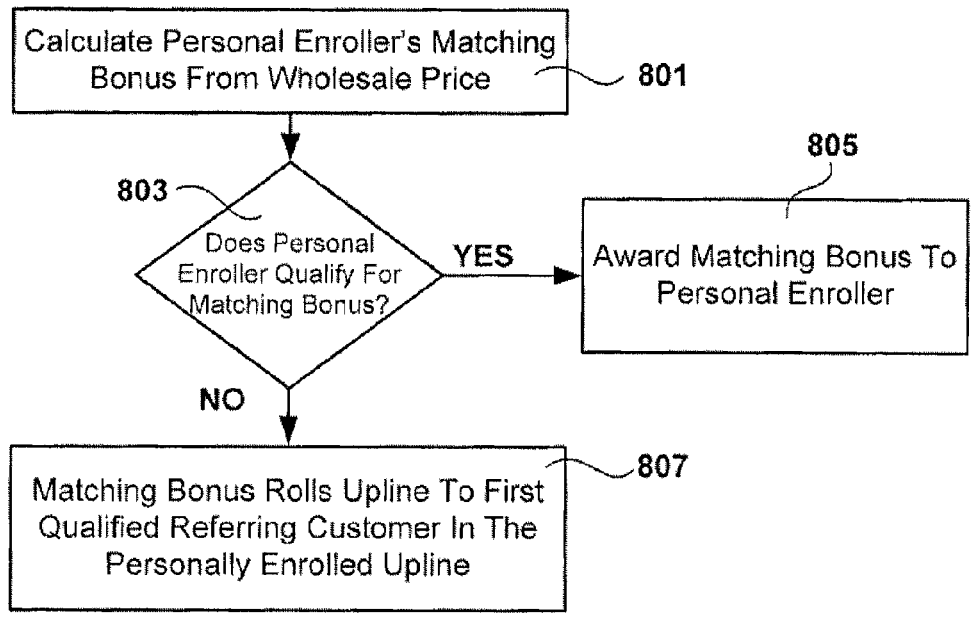
FIG. 8 illustrates a flowchart of a preferred method of awarding a Personal Enroller Matching Bonus.

In another exemplary embodiment, described with reference to FIG. 8, a Personal Enroller's Matching Bonus is calculated 801 from the wholesale volume of product sold for a specified compensation period. If the Personal Enroller qualifies 803 for the matching Personal Enroller Bonus the bonus is awarded 805 to him. If the Personal Enroller does not qualify for the matching bonus the matching bonus is rolled upline 807 to the first qualified Referring Customer in the personally enrolled upline.

Figure 9:
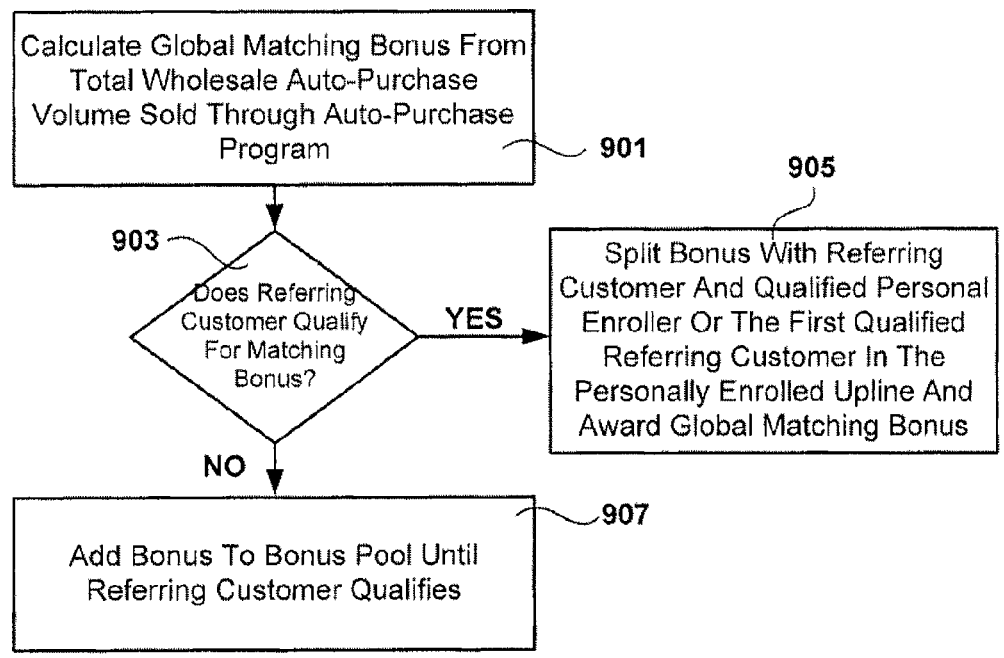
FIG. 9 illustrates a flowchart of a preferred method of awarding Global Matching Bonuses.

In still other exemplary embodiments, described with reference to FIG. 9, a Global Matching Bonus is calculated 901 from the total wholesale Auto-Purchase volume sold through the Auto-Purchase Program for a specified compensation period. If a Referring Customer qualifies 903 for the Global Matching Bonus, the bonus is split 905 between the Referring Customer and the qualified Personal Enroller or the first qualified upline Referring Customer and the bonus is awarded. If the Referring Customer does not qualify for the Global Matching Bonus the Global Matching Bonus is added 907 to the Global Matching Bonus Pool until the Referring Customer does qualify.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method, performed by one or more processors of a computer system, for positioning participants of an organization within a Performance-Driven Floating (PDF) matrix, the method comprising:

determining a number of products sold by an organization during a first production period of a program;

generating, by the one or more processors, a PDF matrix that includes a plurality of positions arranged hierarchically in a plurality of levels, wherein at least one level includes fewer positions than a layer immediately below the level in the matrix, the PDF matrix for arranging customers enrolled in a program based on performance of the customers in the program, wherein the number of positions in the PDF matrix is based on the number of products sold;

associating, by the one or more processors, a compensation formula with each position in the PDF matrix, wherein the compensation formula for at least one position in one level of the PDF matrix is different than the compensation formula for at least one position in a second level of the PDF matrix, and wherein a compensation formula for a position at a higher level yields a higher compensation amount than a compensation formula for a position at a lower level;

accessing, by the one or more processors and for each of a plurality of customers in the program, a number of production points earned by the customer during a first production period, the production points being earned at least partially by one or more of the following:
enrolling another customer into the program;
enrolling another customer into an auto-purchase program; or
attending a training event or activity;

identifying a first set of customers that earned the most production points during the first production period, the first set of customers including a number of customers equal to the number of positions in the PDF matrix;

placing, by the one or more processors, each customer, in the first set of customers, in the PDF matrix based on the number of production points earned by the customer during the first production period such that customers having earned a higher number of production points in the first production period are placed at higher levels in the hierarchy than customers having earned a lower number of production points in the first production period;

calculating, by the one or more processors and for each customer in the PDF matrix, a compensation amount to be paid to the customer for performance during the first production period, the compensation amount being calculated based on:
the compensation formula associated with the position in the matrix to which the customer was assigned based on the number of production points earned by the customer during the first production period; and
an amount of sales generated by the customer during the first production period;

determining a number of products sold by the organization during a second production period;

modifying the PDF matrix to include a number of positions equal to the number of products sold during the second production period;

accessing, by the one or more processors and for each of a plurality of customers, a number of production points earned by the customer during a second production period;

identifying a second set of customers that earned the most production points during the second production period, the second set of customers including a number of customers equal to the number of positions in the PDF matrix; and placing, by the one or more processors, each customer, in the second set of customers, in the PDF matrix based on the number of production points earned by the customer during the second production period such that customers having earned a higher number of production points in the second production period are placed at higher levels in the hierarchy than customers having earned a lower number of production points in the second production period, and such that customers receive a compensation amount for sales generated during the second production period based on the compensation formula of the position in the matrix to which the customers were repositioned.

2. The method of claim 1, wherein the number of positions in the PDF matrix is equal to the number of products sold.

3. The method of claim 1, wherein the number of positions in the PDF matrix is a multiple of the number of products sold.

4. The method of claim 1, wherein the each production period is one of: one month, two months, three months, four months, six months, or one year.

5. The method of claim 1, wherein, when two or more customers earn the same number of production points, a customer that most recently enrolled in the program is placed in the PDF matrix before other customers having earned the same number of production points.

6. The method of claim 1, wherein the placement of customers in the PDF matrix is based on a status of the customers in addition to production points earned by the customers.

7. The method of claim 1, further comprising:
determining that the number of products sold during a production period is insufficient to cause a bottom level of the PDF matrix to be completely filled with customers; and
filling the bottom level with customers according to a predetermined placement plan.

8. The method of claim 7, wherein one or more customers already assigned to a position in the PDF matrix are also assigned to a position in the bottom level of the PDF matrix that was not filled.

9. One or more non-transitory computer readable media storing computer executable instructions which when executed by one or more processors implement a method for positioning participants of an organization within a Performance-Driven Floating (PDF) matrix, the method comprising:
determining a number of products sold by an organization during a first production period of a program;
generating, by the one or more processors, a PDF matrix that includes a plurality of positions arranged hierarchically in a plurality of levels, wherein at least one level includes fewer positions than a layer immediately below the level in the matrix, the PDF matrix for arranging customers enrolled in a program based on performance of the customers in the program, wherein the number of positions in the PDF matrix is based on the number of products sold;
associating, by the one or more processors, a compensation formula with each position in the PDF matrix, wherein the compensation formula for at least one position in one level of the PDF matrix is different than the compensation formula for at least one position in a second level of the PDF matrix, and wherein a compensation formula for a position at a higher level yields a higher compensation amount than a compensation formula for a position at a lower level;
accessing, by the one or more processors and for each of a plurality of customers in the program, a number of production points earned by the customer during a first production period, the production points being earned at least partially by one or more of the following:
enrolling another customer into the program;
enrolling another customer into an auto-purchase program; or
attending a training event or activity;
identifying a first set of customers that earned the most production points during the first production period, the first set of customers including a number of customers equal to the number of positions in the PDF matrix;
placing, by the one or more processors, each customer, in the first set of customers, in the PDF matrix based on the number of production points earned by the customer during the first production period such that customers having earned a higher number of production points in the first production period are placed at higher levels in the hierarchy than customers having earned a lower number of production points in the first production period;

calculating, by the one or more processors and for each customer in the PDF matrix, a compensation amount to be paid to the customer for performance during the first production period, the compensation amount being calculated based on:
- the compensation formula associated with the position in the matrix to which the customer was assigned based on the number of production points earned by the customer during the first production period; and
- an amount of sales generated by the customer during the first production period;

determining a number of products sold by the organization during a second production period;

modifying the PDF matrix to include a number of positions equal to the number of products sold during the second production period;

accessing, by the one or more processors and for each of a plurality of customers, a number of production points earned by the customer during a second production period;

identifying a second set of customers that earned the most production points during the second production period, the second set of customers including a number of customers equal to the number of positions in the PDF matrix; and placing, by the one or more processors, each customer, in the second set of customers, in the PDF matrix based on the number of production points earned by the customer during the second production period such that customers having earned a higher number of production points in the second production period are placed at higher levels in the hierarchy than customers having earned a lower number of production points in the second production period, and such that customers receive a compensation amount for sales generated during the second production period based on the compensation formula of the position in the matrix to which the customers were repositioned.

10. The one or more computer readable media of claim 9, wherein the number of positions in the PDF matrix is equal to the number of products sold.

11. The one or more computer readable media of claim 9, wherein the number of positions in the PDF matrix is a multiple of the number of products sold.

12. The one or more computer readable media of claim 9, wherein the each production period is one of: one month, two months, three months, four months, six months, or one year.

13. The one or more computer readable media of claim 9, wherein, when two or more customers earn the same number of production points, a customer that most recently enrolled in the program is placed in the PDF matrix before other customers having earned the same number of production points.

14. The one or more computer readable media of claim 9, wherein the placement of customers in the PDF matrix is based on a status of the customers in addition to production points earned by the customers.

15. The one or more computer readable media of claim 9, wherein the method further comprises:
- determining that the number of products sold during a production period is insufficient to cause a bottom level of the PDF matrix to be completely filled with customers; and
- filling the bottom level with customers according to a predetermined placement plan.

16. The one or more computer readable media of claim 14, wherein one or more customers already assigned to a position in the PDF matrix are also assigned to a position in the bottom level of the PDF matrix that was not filled.

* * * * *